3,272,863
1,1'-(ALKYLENE)BIS(5-ARYLBIGUANIDES)
Royal A. Cutler, Sand Lake, and Samuel Schalit, Albany, N.Y., assignors to Sterling Drug Inc., New York, N.Y., a corporation of Delaware
No Drawing. Filed Mar. 27, 1964, Ser. No. 355,478
18 Claims. (Cl. 260—565)

This application is a continuation-in-part of our prior application Serial No. 22,692, filed April 18, 1960, and now abandoned.

This invention relates to certain novel 1,1'-(alkylene)-bis(5-arylbiguanides) and acid-addition salts thereof.

The 1,1'-(alkylene)bis(5-arylbiguanides) of the instant invention are represented in the free base form by the structural formula

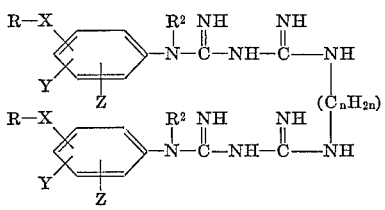

FORMULA I wherein $C_nH_{2n}$ represents a bivalent alkylene bridge in which the free valence bonds are on two different carbon atoms and $n$ is an integer from 2 to 12 inclusive; $R^2$ is a member of the group consisting of hydrogen and alkyl containing 1–4 carbon atoms; Y is a member of the group consisting of hydrogen, halogen, trifluoromethyl, nitro, lower alkyl —O—, lower alkyl —S—, lower alkyl —SO—, and lower alkyl —SO$_2$—; Z is a member of the group consisting of hydrogen, halogen, nitro, lower alkyl, and lower alkyl —O—; R is a member of the group consisting of alkyl containing 1–18 carbon atoms, halo-lower alkyl, lower alkenyl, benzyl, ar-halobenzyl, ar-nitrobenzyl, ar-lower alkylbenzyl, lower alkoxybenzyl, cyclohexyl, phenyl, lower alkylphenyl, nitrophenyl, lower alkoxyphenyl, halophenyl, and, when neither of Y and Z is nitro, the further members ar-aminobenzyl and aminophenyl; and X is a member of the group consisting of —S—, —SO—, and —SO$_2$—.

As will be seen from the identity of the radical X in the Formula I above, all of our new compounds are sulfides, sulfoxides, or sulfones.

The bivalent alkylene bridge, $C_nH_{2n}$, in Formula I above is preferably polymethylene, represented by —(CH$_2$)$_n$— or equivalently by —(CH$_2$)$_{2-12}$—, but also includes branched chain alkylene bridges. Thus, $C_nH_{2n}$ includes the alpha, omega divalent unbranched radicals ethylene, trimethylene, tetramethylene, pentamethylene, hexamethylene, heptamethylene, octamethylene, nonamethylene, decamethylene, undecamethylene, and dodecamethylene, and also includes for example the branched divalent radicals 1,3-propylene, 1,4-pentylene, 1,10-dodecamethylene, and the like.

When $R^2$ is alkyl containing 1–4 carbon atoms there are included methyl, ethyl, n-propyl, isopropyl, n-butyl, isobutyl, and tert-butyl.

The term "lower" used in connection with the choices for the radical R is used in each instance to indicate that 1–6 carbon atoms are present in the lower alkyl, lower alkenyl, or lower alkoxy group which is referred to.

In Formula I, when R is alkyl, there are included branched and unbranched alkyls of lower, intermediate, and higher molecular weight, preferably alkyl having 1–18 carbon atoms, and thus including, for example, methyl, ethyl, n-propyl, isopropyl, n-butyl, isobutyl, n-amyl, isohexyl, n-octyl, n-dodecyl, n-hexadecyl, n-octadecyl, and the like. Halo-lower alkyl includes, for example, 2-chloroethyl, 2-bromoethyl, trifluoromethyl, and the like. Lower alkenyl includes allyl, methallyl, and the like. The substituted benzyl radicals referred to in the definition of R, viz., ar-halobenzyl, ar-lower alkoxybenzyl, ar-nitrobenzyl, ar-aminobenzyl, and ar-lower alkylbenzyl, are of course benzyl radicals containing respectively halogen, nitro, amino, and methyl substituents in the benzene ring. Preferably, one or two such substituents are present. These include, for example, 2-chlorobenzyl, 3-chlorobenzyl, 4-chlorobenzyl, 3,4-dichlorobenzyl, 4-bromobenzyl, 2,5-dibromobenzyl, 3-fluorobenzyl, 2,4-difluorobenzyl, 4-iodobenzyl, 2-chloro-4-bromobenzyl, 3-methoxybenzyl, 2-ethoxybenzyl, 2,4-dimethoxybenzyl, 2-nitrobenzyl, 4-nitrobenzyl, 4-aminobenzyl, 4-methylbenzyl, 2-methylbenzyl, and the like. The substituted phenyl radicals within the definition of R, viz., lower alkylphenyl, nitrophenyl, lower alkoxyphenyl, halophenyl, and aminophenyl, preferably contain 1–2 of the respective substituents in the ring and include for example 2-methylphenyl, 3-methylphenyl, 4-methylphenyl, 4-ethylphenyl, 2-nitrophenyl, 3-nitrophenyl, 4-nitrophenyl, 2,4-dinitrophenyl, 4-methoxyphenyl, 2-methoxyphenyl, 3-ethoxyphenyl, 3,5-dimethoxyphenyl, 4-chlorophenyl, 2,4-dichlorophenyl, 3-bromophenyl, 3,4-dibromophenyl, 4-fluorophenyl, 4-iodophenyl, 2-aminophenyl, 3-aminophenyl, 4-aminophenyl, 2,4-diaminophenyl, and the like.

The radical Y in Formula I is hydrogen; halogen, that is fluorine, chlorine, bromine, and iodine; trifluoromethyl; nitro; and lower alkyl —O—, lower alkyl —S—, lower alkyl —SO—, and lower alkyl —SO$_2$— in which the lower alkyl in each instance preferably contains about 1–6 carbon atoms such as methoxy, ethoxy, isopropoxy, n-butoxy, methylmercapto, ethylmercapto, n-propylmercapto, isobutylmercapto, n-hexylmercapto, methylsulfinyl, n-propylsulfinyl, isohexylsulfinyl, methylsulfonyl, ethylsulfonyl, n-butylsulfonyl, n-hexylsulfonyl, and the like.

The radical Z in Formula I is hydrogen; halogen, that is fluorine, chlorine, bromine, and iodine; nitro; and lower alkyl and lower alkyl —O—, in which lower alkyl in each instance preferably contains 1–6 carbon atoms, such as methyl, ethyl, isopropyl, n-butyl, isohexyl, methoxy, ethoxy, n-propoxy, isobutoxy, n-hexoxy, and the like.

The compounds of Formula I are basic substances which interact with one or two equivalents of an organic or inorganic acid to form the corresponding mono- or di-acid-addition salts. These acid-addition salts and the free bases of course have the common structural entity represented by the structural Formula I. The acid-addition salts are the full equivalents of the free base forms, and the new compounds of this invention include both the free bases and the acid-addition salts thereof. The novel feature of the compounds of the invention thus resides in the concept of the bases and cationic forms of the new 1,1'-(alkylene)bis(5-arylbiguanides) and not in any particular acid moiety or acid anion associated with the salt forms of our componnds; rather, the acid moieties or anions which can be associated in the salt forms are in themselves neither novel nor critical and therefore can be any acid anion or acid-like substance capable of salt formation with bases. It will be appreciated that in aqueous solutions the base form and the water-soluble acid-addition salt form of the compounds of the invention possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and poly-carboxylic acids such as found, for example, in Beilstein's Organische Chemie, 4th Ed., volumes III, IV, IX, X, XIV, XVII, XIX, XXI, XXII, and XXV; organic mono- and polysulfonic and -sulfinic acids such as found, for example in Beilstein, volumes VI, XI, XVI, and XXII; organic phosphonic and phosphinic acids such as found, for example, in Beilstein, volumes XI and XVI; organic acids of arsenic and antimony such as found, for example, in Beilstein, volume XVI; organic heterocyclic carboxylic, sulfonic, and sulfinic acids such as found, for example in Beilstein, volumes XVIII, XXII, and XXV; acidic ion-exchange resins; and inorganic acids of any acid forming element or combination of elements such as found in Mellor, Comprehensive Treatise on Inorganic and Theoretical Chemistry, Longmans, Green and Co., New York, N.Y., volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there are also comprehended acidic phenolic compounds such as found, for example, in volume VI of Beilstein, acidic compounds having "activated" or acidic hydrogen atoms, as for example, picrolonic acid, or barbituric acid derivatives having an acidic proton such as found, for example, in Cox et al. Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example boron trifluoride.

Representative acids for the formation of the acid-addition salts include formic acid, acetic acid, isobutyric acid, alpha-mercaptopropionic acid, trifluoroacetic acid, malic acid, fumaric acid, succinic acid, succinamic acid, glutamic acid, tartaric acid, oxalic acid, pyromucic acid, citric acid, lactic acid, glycolic acid, gluconic acid, saccharic acid, ascorbic acid, penicillin, benzoic acid, phthalic acid, salicylic acid, 3,5-dinitrobenzoic acid, anthranilic acid, pamoic acid, cholic acid, 2-pyridinecarboxylic acid, 3-hydroxy-2-naphthoic acid, picric acid, quinic acid, tropic acid, 3-indoleacetic acid, barbituric acid, sulfamic acid, methanesulfonic acid, ethanesulfonic acid, isethionic acid, benzenesulfonic acid, p-toluenesulfonic acid, butylarsonic acid, methanephosphonic acid, acidic resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, arsenic acid, and the like.

The acid-addition salts are prepared in conventional fashion, for instance either by direct mixing of the acid and the base or, when this is not appropriate, by dissolving either or both of the acid and the base separately in water or an organic solvent and mixing the two solutions, or by dissolving both the acid and the base together in a solvent. The resulting acid-addition salt is isolated by filtration, if it is insoluble in the reaction medium, or by evaporation of the reaction medium to leave the acid-addition salt as a residue.

Our new bases of Formula I and the mono- and di-acid-addition salts thereof have antibacterial and antifungal properties. Thus, when tested by standard serial dilution procedures, these compounds were found to have bactericidal, bacteriostatic, fungicidal, and fungistatic activity in vitro. Moreover, some of these compounds exhibited antiviral activity, and others had amebacidal activity. Illustrative biological data are given below in the examples.

The new bases of Formula I and the mono- and di-acid-addition salts thereof are useful as disinfecting and sanitizing agents for application to living and non-living surfaces by conventional swabbing, padding, spraying, immersing, rinsing, and the like techniques. Depending on the particular purpose involved, the compounds are used in aqueous solution, as in water or in aqueous detergent solutions, or in the form of solutions in organic solvents. Some of the compounds, for instance the 1,1'-hexamethylenebis[5 - (4 - alkylmercaptophenyl)biguanides] are especially useful for imparting an antibacterial and antifungal finish to cotton cloth.

The mono- and di-acid-addition salts of the bases of Formula I are useful not only as disinfecting and sanitizing agents, as above-indicated, but are also useful as characterizing or identifying derivatives of the free bases and in isolation or purification procedures. Moreover, the acid-addition salts react with strong bases, such as alkali metal hydroxides, to generate the free bases, and accordingly all of the salts, regardless of considerations of solubility, toxicity, physical form, or the like of a particular species of acid-addition salt, are useful for the purposes of our invention since they are sources of the free bases.

It will be appreciated from the above that if one or more of the characteristics, such as solubility, molecular weight, physical appearance, toxicity, or the like of a given acid-addition salt render it unsuitable for the particular desired purpose, as for example, use as an antibacterial agent or in an isolation or purification procedure, or the like, the acid-addition salt can be converted to the free base and then to another, more suitable acid-addition salt, for instance a pharmaceutically-acceptable salt when a pharmaceutical use is involved.

We particularly prefer those bases of Formula I, and the acid-addition salts thereof, wherein $n$ is 5, 6, and 7, and

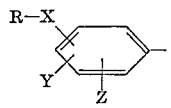

is lower alkylmercaptophenyl and lower alkylmercaptohalophenyl, since the members of this group of compounds are especially useful as disinfecting and sanitizing agents.

The new compounds of our invention, except for those wherein R is ar-aminobenzyl or aminophenyl, for which a different method is used as described hereinbelow, are conveniently obtained by the process which comprises interacting a 1,1'-(alkylene)bis(3-cyanoguanidine) having the structural formula

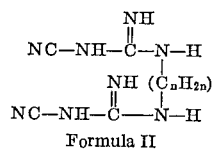

Formula II with approximately two molecular proportions of an arylamine having the structural formula

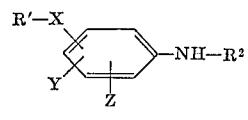

Formula III wherein X, Y, Z, R², and $n$ have the same respective meanings stated hereinabove and R' is a member of the group consisting of alkyl, halo-lower alkyl, lower alkenyl, benzyl, ar-halobenzyl, ar-nitrobenzyl, ar-lower alkylbenzyl, lower alkoxybenzyl, cyclohexyl, phenyl, lower alkylphenyl, nitrophenyl, lower alkoxyphenyl, and halophenyl, in the form of a suitable acid-addition salt, such as the hydrochloride of the arylamine. This process is carried out by heating the reactants together, preferably in the presence of an inert diluent such as 2-ethoxyethanol, 2-methoxyethanol, o-dichlorobenzene, and the like. We have found that it is generally convenient and satisfactory to reflux a mixture of the 1,1'-(alkylene)bis(3- cyanoguanidine) (Formula II) and the hydrochloride of the arylamine (Formula III) in 2-ethoxyethanol until the reaction is complete. The reaction product, which is the dihydrochloride of a 1,1'-(alkylene)bis(5-arylbiguanide) of Formula I, has low solubility in 2-ethoxyethanol and in water and is readily isolated.

If desired, the dihydrochloride is converted to the corresponding free base form of Formula I by treatment with two molecular equivalents of a strong base such as sodium hydroxide. This free base can be used as such, or can be converted to any desired acid-addition salt.

A second method for preparing our new compounds comprises interacting a suitable acid-addition salt, such as the dihydrochloride, of an alkylenediamine having the structural formula $$H_2N-(C_nH_{2n})-NH_2$$

Formula IV with approximately two molecular proportions of a 1-aryl-3-cyanoguanidine having the structural formula

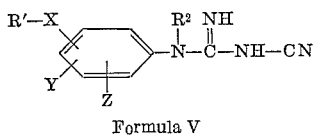

Formula V wherein R', R², X, Y, Z, and $n$ have the same respective meanings stated hereinabove. This process is conveniently carried out by heating the reactants together, preferably in the presence of an inert diluent such as nitrobenzene. The reaction product, the dihydrochloride of a base of Formula I, has low solubility in nitrobenzene and is readily isolated by conventional means, as by collecting on a filter.

The species of Formula I wherein R is aminophenyl or aminobenzyl are obtained by reducing the corresponding nitrophenyl and nitrobenzyl compounds, for instance with iron and acid. As will be appreciated, a choice of nitro for either Y or Z in the product of this reaction is incompatible with the reduction process, and the definition of R in Formula I takes this fact into appropriate account.

The species of Formula I which are sulfoxides can be prepared by the general methods above and also by oxidation of the corresponding sulfides, for instance by oxidation with one equivalent of either hydrogen peroxide or an organic per-acid such as peracetic acid or perbenzoic acid. The species of Formula I which are sulfones can be prepared by the general methods above and also by oxidation of the corresponding sulfides with two equivalents, or of the corresponding sulfoxides with one equivalent, of either hydrogen peroxide or an organic per-acid such as peracetic acid or perbenzoic acid.

The 1,1'-(alkylene)bis(3-cyanoguanidines) (Formula II) and the arylamines (Formula III) used as starting materials in the first of the foregoing methods for preparing our new compounds and the alkylenediamines (Formula IV) employed in the second method of preparation are all old known classes of compounds, being readily prepared by known methods. For instance, the 1,1'-(alkylene)bis(3-cyanoguanidines) (Formula II) are obtained conveniently by interaction of the appropriate alkylenediamine (Formula IV) dihydrochloride with two molecular proportions of sodium dicyanamide in boiling butanol.

The 1-aryl-3-cyanoguanidines of Formula V are prepared by interacting approximately equimolecular amounts of an appropriate arylamine (Formula III) acid-addition salt, such as the hydrochloride, and an alkali metal dicyanamide, such as sodium dicyanamide or potassium dicyanamide, in accordance with the following equation:

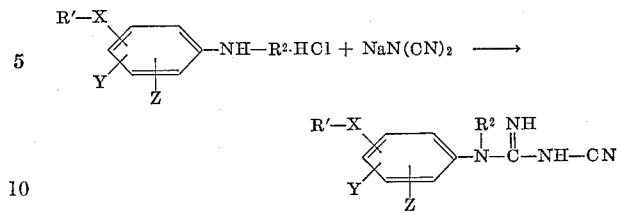

For example, the arylamine (Formula III) hydrochloride (or alternatively equivalent amounts of the arylamine and hydrogen chloride, as hydrochloric acid) and sodium dicyanamide are heated in a reaction medium of water, and the resulting product, which precipitates from solution, is isolated by filtration.

The chemical structures of the compounds of this invention followed from the modes of preparation and from elementary analyses of the products.

Our invention is illustrated by the following examples without, however, being limited thereto.

EXAMPLE 1

*1,1'-hexamethylenebis[5-(4-methylmercaptophenyl)-biguanide]*

A. A mixture of 22 g. of 1,1'-hexamethylenebis(3-cyanoguanidine), 33 g. of 4-methylmercaptoaniline hydrochloride, and 290 ml. of 2-ethoxyethanol was refluxed for two hours, using a heated wax bath to prevent charring. While the mixture was being warmed up, all of the solid dissolved and shortly thereafter a solid separated from the solution in a thick mass. After the reflux period has ended, the reaction mixture was chilled and was then filtered. The tan solid thus collected was washed first with cold 2-ethoxyethanol and then with water, and was dried. There was thus obtained 40 g. of tan powder which melted at 252–254° C. This solid was recrystallized from 21 volumes of 50 percent aqueous acetic acid. There was thus obtained 32 g. of cream colored powder which melted at 247–248° C. This product was the dihydrochloride of 1,1'-hexamethylenebis[5-(4-methylmercaptophenyl)biguanide] (Formula I: $R^2=H$; $R-X-=4-CH_3-S-$; $Y=H$; $Z=H$; $n=6$), having the molecular formula $C_{24}H_{36}N_{10}S_2 \cdot 2HCl$. The water-solubility of this compound was less than 0.25 percent at 25° C., and its solubility in 95 percent ethyl alcohol at 25° C. was less than 1 percent (weight/volume).

When this compound was tested for in vitro antibacterial and antifungal activity, the respective maximum effective aqueous dilutions showing bacteriostatic (Bs), bactericidal (Bc), fungistatic (Fs) or fungical (Fc) activity against the indicated test organisms were as follows:

*Staphylococcus aureus* 209: Bs=1–100,000; Bc=1–100,000.

*Eberthella typhi*, Hopkins: Bs=1–100,000; Bc=1–100,000.

*Trichophyton interdigitale*: Fs=1–133,000; Fc=1–100,000.

*Trichophyton mentagrophytes*: Fs=1–133,000; Fc=1–40,000.

*Aspergillus niger*: Fs=1–40,000; Fc=1–20,000.

*Trichophyton gypseum*: Fs=1–133,000; Fc=1–100,000.

*Monilia albicans*: Fs=1–133,000; Fc=1–133,000.

*Histoplasma capsulatum* (mycelia phase): Fs=1–200,000; Fc=1–100,000.

*Pityrosporum ovale*: Fs=1–1,000,000; Fc=1–133,000.

This compound was found to have bacteriostatic activity against *Staphylococcus aureus* and *Escherichia coli* in aqueous solutions of soap, sodium lauryl sulfate and nonylpolyglycol ether (Igepal CO-630—Antara Chemicals).

This compound was also found to be active in vitro against meningopneumonitis virus.

B. To a stirred, boiling solution of 39 g. of 1,1'-hexamethylenebis[5 - (4 - methylmercaptophenyl)biguanide] dihydrochloride in 830 ml. of 50 percent aqueous acetic acid there was added 830 ml. of 35 percent aqueous sodium hydroxide solution at a rate sufficient to maintain the reaction at gentle reflux. After addition of the alkali was completed, the cloudy reaction mixture was cooled with stirring and was then filtered to collect the solid precipitate. The damp, light-brown filter cake was stirred with 600 ml. of cold water and the mixture was filtered. The beady, brown solid thus collected was washed with water. While being sucked free of water on the filter, the solid became sticky. The solid and the filter paper adhering to it were placed in 150 ml. of anhydrous ethyl alcohol, and the mixture was stirred vigorously while refluxing the alcohol for fifteen minutes.

The mixture was chilled and was then filtered. The tan solid thus collected was washed with cold anhydrous ethyl alcohol and dried. The dry solid was ground in a mortar and the resulting powder was mixed with 50 ml. of boiling anhydrous ethyl alcohol. After chilling, the mixture was filtered and the collected solid was dried. There was thus obtained 20 g. of 1,1'-hexamethylenebis [5 - (4 - methylmercaptophenyl)biguanide] (Formula I: $R^2$=H; R—X—=4-$CH_3$—S—; Y=H; Z=H; n=6), having the molecular formula $C_{24}H_{36}N_{10}S_2$. This product was a tan powder which melted at 169–172° C. The solubilities of this base in water and 95 percent ethyl alcohol were similar to those of the base hydrochloride. The base was readily soluble in glacial acetic acid.

Cotton cloth was drawn through a 0.5 percent solution of this base in ethyl alcohol and was passed through a set of squeeze rolls which left on the cloth a weight of the solution amounting to 70 percent of the weight of the dry cloth. The wet cloth was then heated in an oven at 160° F. until dry. The cloth thus treated was then tested by the method described by Paul A. Majors in the American Dyestuff Reporter, 48, No. 3, p. 91–93 (1959) and was found to have an antibacterial coating which was highly resistant to washing, and still had effective antibacterial activity against *Staphylococcus aureus* after twenty-five washes with water and against *Brevibacterium ammoniagenes* after twenty washes with water.

C. To a slurry of 5 g. of 1,1'-hexamethylenebis[5-(4-methylmercaptophenyl)biguanide] dihydrochloride in 50 ml. of water there was added 3.4 ml. of 35 percent aqueous sodium hydroxide solution and the resulting mixture was stirred vigorously for about seven hours in an ice bath. The mixture was filtered, and the tan solid thus collected was washed with water and was then sucked dry on the filter. There was thus obtained 3 g. of 1,1' - hexamethylenebis[5 - (4 - methylmercaptophenyl)biguanide]. This was the same product as that obtained in part B above.

D. To 61 g. of 1,1'-hexamethylenebis[5-(4-methylmercaptophenyl)biguanide] there was added about 100 ml. of acetic acid while cooling the mixture in an ice bath. After addition of the acetic acid was completed, the mixture was stirred vigorously on a steam bath for several minutes. The mixture was then cooled, 1250 ml. of anhydrous diethyl ether was added, and the mixture was chilled overnight. The mixture was then filtered, and the tan solid thus collected was ground in a mortar and was washed with diethyl ether. The resulting solid product, which weighed 77 g. was recrystallized from three volumes of water containing decolorizing charcoal and a few drops of acetic acid. There was thus obtained 42 g. of 1,1'-hexamethylenebis[5-(4-methylmercaptophenyl)biguanide] diacetate as a pale yellow powder which melted at 91–97° C. The solubility of this product in water at 25° C. was less than 0.25 percent. In ethyl alcohol it was soluble up to 5 percent (weight/volume). It was not precipitated from a 5 percent solution in ethyl alcohol by addition of four volumes of water, the pH of the diluted solution being 6.7.

By treatment of this diacetate with two molecular equivalents of sodium hydroxide, the free base, 1,1'-hexamethylenebis[5 - (4 - methylmercaptophenyl)biguanide], is regenerated.

Tests of the in vitro activity of this diacetate against the bacteria and fungi mentioned in part A of Example 1 above showed results similar to those obtained using the dihydrochloride. In mice, for this diacetate the $LD_{50}$ was 1750±480 mg./kg. (for the corresponding free base, 1420±390 mg./kg.) orally; was approximately 1500 mg./kg. intragastrically; and was approximately 150 mg./kg. intraperitoneally.

E. 23 g. of 1,1'-hexamethylenebis[5-(4-methylmercaptophenyl)biguanide] was dissolved in 300 ml. of dimethyl sulfoxide, and the slightly cloudy solution was filtered through a sintered glass filter. A piece of ice was added to the clear yellow filtrate to cool it and ice water was added until the solution became faintly turbid. There was then added 23 g. of an acidic ion exchange resin having the formula

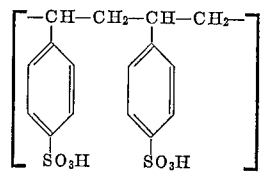

(Amberlite XE–66—Rohm and Haas) to the solution and the mixture was shaken for four hours. The mixture was filtered, and the collected solid was washed well with water and was then dried in a vacuum oven at 95° C. for four hours. There was thus obtained 42.3 g. of the resin salt of 1,1'-hexamethylenebis[5-(4-methylmercaptophenyl)biguanide] as a tan powder which did not melt when heated at 300° C. This product had the molecular formula $C_{24}H_{36}N_{10}S_2 \cdot (C_8H_8O_3S)_n$.

In hamsters, this resin salt was active against *Endamoeba criceti* at a dose level of 100 mg./kg./day.

EXAMPLE 2

*1,1'-hexamethylenebis[5-(2-methylmercaptophenyl) biguanide]*

Following the same procedure as that described in part A of Example 1, but substituting 33 g. of 2-methylmercaptoaniline for the 4-methylmercaptoaniline, there is obtained as the reaction product the dihydrochloride of 1,1' - hexamethylenebis[5-(2-methylmercaptophenyl) biguanide] (Formula I: $R^2$=H; R—X—=2-$CH_3$—S—; Y=H; Z=H; n=6). By treating this salt with sodium hydroxide, using the procedure of either part B or part C of Example 1, there is obtained the corresponding free base, 1,1'-hexamethylenebis[5-(2-methylmercaptophenyl)biguanide]. When treated with two equivalents of acetic acid, using the manipulative procedure of part D of Example 1, the base is converted to its diacetate salt.

EXAMPLE 3

*1,1'-hexamethylenebis[5-(4-methylmercaptophenyl) biguanide]*

A. A mixture of 7.55 g. of 4-methylmercaptoaniline and a solution of 6.09 g. of potassium dicyanamide in 50 ml. of water was warmed, and then 4.8 ml. of concentrated hydrochloric acid was added. The mixture was heated at 80° C. for fifteen minutes and was filtered while still hot. The brown solid thus collected was washed with water and dried. A 2 g. portion of this product (total yield, 8.9 g.) was dissolved in anhydrous ethyl alcohol, and after addition of decolorizing charcoal the mixture was filtered while hot. After cooling the filtrate, the solid which had separated from solution was collected on a filter. This solid, which weighed 0.9 g., was recrystallized from n-butyl alcohol, with charcoaling, to yield a solid which melted at 210–212° C. This product was 1-(4-methylmercaptophenyl)-3-cyanoguanidine (Formula V: $R^2$=H; R—X—=4-$CH_3$—S—; Y=H; Z=H), having the molecular formula $C_9H_{10}N_4S$.

B. A mixture of 3.3 g. of hexamethylenediamine dihydrochloride, 7.1 g. of 1-(4-methylmercaptophenyl)-3-cyanoguanidine, and 35 ml. of nitrobenzene is heated at 150–160° C. for six hours and then the reaction mixture is filtered while still hot. The solid collected in this manner is recrystallized from 50 percent aqueous acetic acid, with charcoaling. There is thus obtained the dihydrochloride of 1,1'-hexamethylenebis[5-(4-methylmercaptophenyl)biguanide], the same product as that described in part A of Example 1.

EXAMPLE 4

*1,1'-hexamethylenebis[5-(3-methylmercaptophenyl)biguanide]*

Following the same procedure as that described in part A of Example 1, but substituting 33 g. of 3-methylmercaptoaniline hydrochloride for the 4-methylmercaptoaniline hydrochloride, there is obtained as the reaction product the dihydrochloride of 1,1'-hexamethylenebis[5-(3-methylmercaptophenyl)-biguanide] (Formula I: $R^2$=H; R—X—=3-$CH_3$—S—; Y=H; Z=H; n=6). By treating this salt with sodium hydroxide, using the procedure of either part B or part C of Example 1, there is obtained the corresponding free base, 1,1'-hexamethylenebis[5-(3-methylmercaptophenyl)biguanide]. When treated with two equivalents of acetic acid, using the manipulative procedure of part D of Example 1, the base is converted to its diacetate salt.

EXAMPLE 5

*1,1'-hexamethylenebis[5-(4-methylsulfinylphenyl)biguanide]*

By substituting 35.7 g. of 4-methylsulfinylaniline hydrochloride for the 4-methylmercaptoaniline hydrochloride in the procedure of part A of Example 1, the reaction product obtained is the dihydrochloride of 1,1'-hexamethylenebis[5-(4-methylsulfinylphenyl)biguanide] (Formula I: $R^2$=H; R—X—=4-$CH_3$—SO—; Y=H; Z=H; n=6). This salt is converted to the corresponding base, 1,1'-hexamethylenebis[5-(4-methylsulfinylphenyl)biguanide] by treatment with two molecular equivalents of sodium hydroxide. Interaction of the base with one equivalent of propionic acid yields 1,1'-hexamethylenebis[5-(4-methylsulfinylphenyl)biguanide] monopropionate.

1,1'-hexamethylenebis[5-(4-methylsulfinylphenyl)biguanide] dihydrochloride is also obtained by oxidation of 1,1'-hexamethylenebis[5-(4-methylmercaptophenyl)biguanide] dihydrochloride with one molecular equivalent of hydrogen peroxide (30 percent solution) at room temperature.

EXAMPLE 6

*1,1'-hexamethylenebis[5-(4-methylsulfonylphenyl)biguanide]*

A. A mixture of 9.85 g. of 1,1'-hexamethylenebis(3-cyanoguanidine), 17 g. of 4-methylsulfonylaniline hydrochloride, and 170 ml. of water was refluxed for three and one-half hours. During this heating period, all of the solid dissolved. After the reflux period was completed, the slightly turbid reaction solution was chilled. A small amount of brown gummy material separated from solution. There was then added to the solution 170 ml. of saturated sodium chloride solution, and the mixture was allowed to stand at room temperature for several days. Then the grey gummy solid which had separated from solution was collected on a filter. This material was placed in 54 ml. of ethyl alcohol. The resulting mixture was boiled and then was cooled and filtered. The solid thus collected was washed with cold anhydrous ethyl alcohol and was sucked dry on the filter. There was obtained in this manner 7 g. of solid. This product was slurried in 14 ml. of cold water, the mixture was filtered, and the collected solid was dried to yield 6 g. of white powder. Recrystallization of 5 g. of this powder from 15 ml. of boiling water containing three drops of dilute hydrochloric acid, using decolorizing charcoal, yielded 4 g. of white solid which softened at 158° C. and had an indefinite melting point. This product was the dihydrochloride monohydrate of 1,1'-hexamethylenebis[5-(4-methylsulfonylphenyl)biguanide] (Formula I: $R^2$=H; R—X—=4-$CH_3$—$SO_2$—; Y=H; Z=H; n=6), having the molecular formula $$C_{24}H_{36}N_{10}O_4S_2 \cdot 2HCl \cdot H_2O$$

This compound was soluble in water at 25° C. to the extent of 1 percent. The pH of the 1 percent aqueous solution was 6.5, and when this solution was adjusted to pH 7.0 by adding 0.1 N aqueous sodium hydroxide solution, no precipitate formed.

When this compound was tested for in vitro antibacterial and antifungal activity, the respective maximum effective aqueous dilutions showing bacteriostatic (Bs), bactericidal (Bc), fungistatic (Fs) or fungicidal (Fc) activity against the indicated test organisms were as follows:

*Staphylococcus aureus* 209, Bs=–10,000; Bc=1–1,000;
*Eberthella typhi*, Hopkins: Bs=1–1,000; Bc=less than 1–1,000;
*Trichophyton mentagrophytes*: Fs=1–1,000; Fc=less than 1–1,000;
*Aspergillus niger*: Fs=less than 1–1,000;
*Monilia albicans*: Fs=1–1,000; Fc=less than 1–1,000.

B. Treatment of the above dihydrochloride with two equivalents of sodium hydroxide yields the corresponding free base, 1,1'-hexamethylenebis[5-(4-methylsulfonylphenyl)biguanide]. The latter reacts with one equivalent of hydrofluoric acid to yield the mono-hydrofluoride salt.

EXAMPLE 7

*1,1'-hexamethylenebis[5-(4-methylsulfonylphenyl)biguanide]*

A. To a slurry of 10 g. of 1,1'-hexamethylenebis[5-(4-methylmercaptophenyl)biguanide] in 50 ml. of water at 20° C. there was added with stirring 11 ml. of 40 percent peracetic acid, cooling being used to prevent the temperature of the reaction mixture from rising above 40° C. After the reaction mixture had been stirred for about three and one-half hours, it was chilled and then filtered to remove 1.35 g. of unreacted 1,1'-hexamethylenebis[5-4-methylmercaptophenyl) biguanide]. To the filtrate there was added 50 ml. of saturated sodium chloride solution and the mixture was allowed to stand for two days, during which time the gummy precipitate present solidified. After chilling the mixture, it was filtered to collect the solid, which was then washed with water and dried. This solid which weighed 7.5 g., was recrystallized from water, using decolorizing charcoal, to obtain a white powder. This product was 1,1'-hexamethylenebis[5-(4-methylsulfonylphenyl)biguanide] dihydrochloride monohydrate, the same compound as that described above in part A of Example 6.

B. Using the procedure of part A above, but substituting 20 g. of 1,1'-hexamethylenebis[5-(4-methylsulfonylphenyl)biguanide] for the 1,1'-hexamethylenebis[5-(4-methylmercaptophenyl)biguanide], there is obtained 1,1'-hexamethylenebis[5-(4-methylsulfonylphenyl)biguanide] dihydrochloride monohydrate, the same compound as that obtained in part A above and in part A of Example 6.

EXAMPLE 8

1,1'-pentamethylenebis[5-(4-methylmercaptophenyl)biguanide]

A. A mixture of 9.2 g. of 1,1'-pentamethylenebis(3-cyanoguanidine), 14.5 g. of 4-methylmercaptoaniline hydrochloride, and 80 ml. of 2-ethoxyethanol was refluxed for two hours. The brown reaction mixture was filtered while still hot to collect as an insoluble solid product the dihydrochloride of 1,1'-pentamethylenebis[5-(4-methylmercaptophenyl)biguanide] (Formula I: $R^2$=H; R—X—=4-$CH_3$—S—; Y=H; Z=H; $n$=5), having the molecular formula $C_{23}H_{34}N_{10}S_2 \cdot 2HCl$.

B. By treatment of the dihydrochloride above with two equivalents of sodium hydroxide there is obtained the free base, 1,1' - pentamethylenebis[5 - (4 - methylmercaptophenyl)biguanide]. The latter reacts with two equivalents of hydrocyanic acid to form 1,1'-pentamethylenebis[5 - (4 - methylmercaptophenyl)biguanide] di-hydrocyanide, which on treatment with two equivalents of sodium hydroxide regenerates the organic free base. When treated with two equivalents of gluconic acid, the base is converted to the digluconate salt.

EXAMPLE 9

1,1'-pentamethylenebis[5-(2-methylmercaptophenyl)biguanide]

Following the same procedure as that described in part A of Example 8, but substituting 14.5 g. of 2-methylmercaptoaniline for the 4-methylmercaptoaniline, there is obtained as the reaction product the dihydrochloride of 1,1'-pentamethylenebis[5 - (2 - methylmercaptophenyl)biguanide] (Formula I: $R^2$=H; R—X—=2-$CH_3$—S—; Y=H; Z=H; $n$=5). By treating this salt with sodium hydroxide, using the procedure of either part B or part C of Example 1, there is obtained the corresponding free base, 1,1' - pentamethylenebis[5 - (2 - methylmercaptophenyl)biguanide]. When treated with two equivalents of acetic acid, using the manipulative procedure of part D of Example 1, the base is converted to its diacetate salt.

EXAMPLE 10

1,1'-heptamethylenebis[5-(4-methylmercaptophenyl)biguanide]

A mixture of 5 g. of 1,1'-heptamethylenebis(3-cyanoguanidine), 7.07 g. of 4-methylmercaptoaniline hydrochloride, and 20 ml. of 2-ethoxyethanol was refluxed. After one-half hour of refluxing, all of the solid had dissolved and within another five minutes sufficient precipitate had come out of solution to make the mixture very thick. A 20 ml. portion of 2-ethoxyethanol was added to thin the mixture, and refluxing was continued to a total reflux time of one and one-half hours. The reaction mixture was then chilled and filtered. The solid thus collected was washed with cold 2-ethoxyethanol and dried. The dry solid was stirred with 28 ml. of cold water, and re-collected on a filter and dried. There was obtained in this manner 6 g. of white solid. This product was the dihydrochloride of 1,1'-heptamethylenebis[5-(4-methylmercaptophenyl)biguanide] (Formula I: $R^2$=H; R—X—=4-$CH_3$—S—; Y=H; Z=H; $n$=7), having the molecular formula $C_{25}H_{38}N_{10}S_2 \cdot 2HCl$. Treatment of this salt with two molecular equivalents of sodium hydroxide yields the free base, 1,1'-heptamethylenebis[5-(4-methylmercaptophenyl)biguanide]. This free base reacts with two molecular equivalents of gluconic acid to form the digluconate salt.

EXAMPLE 11

1,1'-heptamethylenebis[5-(3-methylmercaptophenyl)biguanide]

Following the same procedure as that described in part A of Example 1, but substituting 7.07 g. of 3-methylmercaptoaniline hydrochloride for the 4-methylmercaptoaniline hydrochloride, there is obtained as the reaction product the dihydrochloride of 1,1'-heptamethylenebis[5-(3-methylmercaptophenyl)biguanide] (Formula I: $R^2$=H; R—X—=3-$CH_3$—S—; Y=H; Z=H; $n$=7). By treating this salt with sodium hydroxide, using the procedure of either part B or part C of Example 1, there is obtained the corresponding free base, 1,1'-heptamethylenebis[5-(3-methylmercaptophenyl)biguanide]. When treated with two equivalents of ascorbic acid, this base is converted to its di-ascorbate salt.

EXAMPLE 12

1,1'-ethylenebis[5-(4-methylmercaptophenyl)biguanide]

Following the procedure of part A of Example 1, but substituting 16.9 g. of 1,1'-ethylenebis(3-cyanoguanidine) for the 1,1'-hexamethylenebis(3-cyanoguanidine), there is obtained the dihydrochloride of 1,1'-ethylenebis[5-(4-methylmercaptophenyl)biguanide] (Formula I: $R^2$=H; R—X—=4-$CH_3$—S—; Y=H; Z=H; $n$=2). By treatment with two molecular equivalents of potassium hydroxide, this salt is converted to the free base, 1,1'-ethylenebis[5-(4 - methylmercaptophenyl)biguanide]. This base reacts with two equivalents of trifluoroacetic acid to yield the di-trifluoroacetate salt.

EXAMPLE 13

1,1'-hexamethylenebis[5-(4-ethylmercaptophenyl)biguanide]

A. A mixture of 32.2 g. of 4-ethylmercaptoaniline hydrochloride and 20 g. of 1,1'-hexamethylenebis(3-cyanoguanidine) in 300 ml. of 2-ethoxyethanol was refluxed on a wax bath for two hours. As the mixture was warmed, all of the solid dissolved, and shortly thereafter a solid separated from the solution in a thick mass. After the reflux period was completed, the reaction mixture was chilled and then filtered. The tan solid collected on the filter was washed with cold 2-ethoxyethanol and with water, and was then dried. The resulting solid, which weighed 33.7 g., was recrystallized from 60 volumes of methyl alcohol, using decolorizing charcoal. There was thus obtained 19 g. of white powder which melted at 236–238° C. This product was the dihydrochloride of 1,1'-hexamethylenebis[5-(4 - ethylmercaptophenyl)biguanide] (Formula I: $R^2$=H; R—X—=4-$C_2H_5$—S—; Y=H; Z=H; $n$=6), having the molecular formula $C_{26}H_{40}N_{10}S_2 \cdot 2HCl$. The water-solubility of this compound was less than 0.25 percent at 25° C. and its solubility in 95 percent ethyl alcohol at 25° C. was less than 1 percent (weight/volume).

When this compound was tested for in vitro antibacterial and antifungal activity, the respective maximum effective dilutions showing bacteriostatic (Bs), bactericidal (Bc), fungistatic (Fs) or fungicidal (Fc) activity against the indicated test organisms were as follows:

*Staphylococcus aureus* 209; Bs=1–800,000; Bc=1–80,000;

*Eberthella typhi*, Hopkins: Bs=1–1,000,000; Bc=1–250,000;

*Mycobacterium tuberculosis*, H37Rv: Bs=1–50,000; Bc=1–50,000;

*Pseudomonas aeruginosa:* Bs=1–100,000; Bc=1–20,000;

*Trichophyton mentagrophytes:* Fs=1–133,000; Fc=1–133,000;

*Aspergillus niger:* Fs=1–10,000; Fc=1–10,000;

*Monilia albicans:* Fs=1–200,000; Fc=1–100,000;

*Pityrosporum ovale:* Fs=1–400,000; Fc=1–400,000.

In dilute aqueous solutions of soap, sodium lauryl sulfate, and nonylphenylpolyglycol ether, this dihydrochloride was bacteriostatically active against *Staphylococcus aureus* and *Escherichia coli*. This compound at a concentration of 1.0 mg./ml. in dilute aqueous soap solution was active against the mildew organism *Chaetonium globosum*, Kunze; and at a concentration of 1.0 mg./ml. in a dilute aqueous solution of an organic sulfonate detergent, it was active against *Streptococcus aureus*, 209 and *Eberthella typhi*, Hopkins. This compound also showed activity against feline pneumonitis, canine distemper (Onderstepoort strain), rabies (Flury strain), and meningopneumonitis viruses. In hamsters, it was effective at 100 mg./kg. against *Endamoeba criceti*.

In mice, the $LD_{50}$ of this dihydrochloride was approximately 350 mg./kg. intraperitoneally, was greater than 4000 mg./kg. orally, and greater than 2000 mg./kg. intragastrically.

B. To a slurry of 86 g. of 1,1'-hexamethylenebis[5-(4-ethylmercaptophenyl)biguanide] dihydrochloride in 860 ml. of refluxing methyl alcohol there was added 23 ml. of 35 percent aqueous sodium hydroxide solution. Practically all of the solid dissolved, and the resulting cloudy solution was treated with decolorizing charcoal and filtered through a diatomaceous earth filter (Filter-Cel—Johns-Manville). The filtrate was chilled with occasional stirring, and the solid which separated from solution was collected on a filter, and was washed thoroughly with methyl alcohol and then with water, and dried. The resulting product, a cream colored powder which weighed 69 g., was recrystallized from 10 volumes of methyl alcohol, using decolorizing charcoal and a filter of Filter-Cel. There was thus obtained 58 g. of white powder which melted at 147–149° C. This product was 1,1'-hexamethylenebis[5-(4-ethylmercaptophenyl)biguanide] (Formula I: $R^2$=H; R—X—=4-$C_2H_5$—S—; Y=H; Z=H; $n$=6), having the molecular formula $C_{26}H_{40}N_{10}S_2$. The solubility of this compound at 25° C. in each of water and 0.5 N hydrochloric acid was less than 0.25 percent and its solubility in ethyl alcohol was less than 1 percent (weight/volume).

In hamsters, this base was effective at 50 mg./kg./day against *Endamoeba criceti*.

An ethanolic solution of this base was padded onto cotton cloth and the treated cloth was tested for antibacterial activity against *Brevibacterium ammoniagenes*, following the Majors method referred to in part B of Example 1. Before washing, the treated cloth was completely inhibitory to the growth of *Brevibacterium ammoniagenes*; and after five launderings the treated cloth still had some antibacterial activity.

C. To a mixture of 79 g. of 1,1'-hexamethylenebis[5-(4-ethylmercaptophenyl)biguanide] and 32.6 g. of 85.2 percent *dl*-lactic acid there was added 395 ml. of boiling water. This mixture was heated on a steam bath until all of the solid had dissolved, and then decolorizing charcoal was added and the mixture was filtered through Filter-Cel. The filtrate was chilled overnight, and the solid which separated from solution was collected on a filter. The off-white solid, which weighed 81 g., was recrystallized from 2 volumes of water to yield 74 g. of white powder which melted at 92–99° C. This product was 1,1'-hexamethylenebis[5 - (4 - ethylmercaptophenyl) biguanide] di-*dl*-lactate. The water-solubility of this compound was less than 0.25 percent at 25° C. and was about 1 percent in warm water. In ethyl alcohol, it was soluble to the extent of about 1 percent, being precipitated from the 1 percent alcoholic solution by addition of 4 volumes of water.

When added at a concentration of 1–100,000 to urine, this compound inhibited the growth of *Escherichia coli*.

In mice the $LD_{50}$ of this compound was approximately 6000 mg./kg. (twenty-four hour test) and approximately 5000 mg./kg. (seven-day test) orally, and approximately 9 mg./kg. intravenously.

D. To a mixture of 11.1 g. of 1,1'-hexamethylenebis-[5-(4-ethylmercaptophenyl)biguanide] and 8.0 g. of 10-undecylenic acid there was added 60 ml. of boiling isopropyl alcohol. The resulting mixture was heated on a steam bath, decolorizing charcoal was added, and the hot mixture was filtered. The amber colored filtrate was chilled, with occasional stirring and was then filtered to collect the cream colored solid which separated from solution. The solid on the filter was washed with isopropyl alcohol, sucked partially dry, and then dried in a vacuum oven at 25° C. There was thus obtained 11.6 g. of cream colored powder which melted at 68–80° C. This product was 1,1'-hexamethylenebis[5-(4-ethylmercaptophenyl)biguanide]di-(10-undecylenate), having the molecular formula $C_{26}H_{40}N_{10}S_2 \cdot 2C_{11}H_{20}O_2$. The solubility of this compound in water at 25° C. was less than 0.25 percent, and its solubility in ethyl alcohol at 25° C. was less than 1 percent (weight/volume).

E. To a slurry of 3 g. of 1,1'-hexamethylenebis[5-(4-ethylmercaptophenyl)biguanide] dihydrochloride in 30 ml. of refluxing methyl alcohol there was added 0.8 ml. of 0.01 M aqueous sodium hydroxide solution. On this addition, practically all of the solid dissolved. The slightly cloudy solution was mixed with decolorizing charcoal and filtered. The filtrate was chilled and then filtered through Filter-Cel to collect 2.3 g. of solid. 1 g. of this product, which was 1,1'-hexamethylenebis[5 - (4 - ethylmercaptophenyl) biguanide], was dissolved in 2 ml. of warm acetic acid, 20 ml. of anhydrous diethyl ether was added to the solution, and the mixture was allowed to stand, with occasional stirring, at room temperature until the gummy yellow precipitate present had solidified. The solid was collected on a filter, washed well with anhydrous diethyl ether, and dried. This product weighed 0.82 g.; a 0.44 g. portion of it was recrystallized from 3 ml. of isopropyl alcohol, using decolorizing charcoal, to yield 0.15 g. of solid which melted at 165–167° C. This product was 1,1' - hexamethylenebis[5 - (4 - ethylmercaptophenyl)- biguanide] diacetate, having the molecular formula

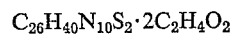

$$C_{26}H_{40}N_{10}S_2 \cdot 2C_2H_4O_2$$

F. A mixture of 1 g. of 1,1'-hexamethylenebis[5-(4-ethylmercaptophenyl)biguanide], 0.394 g. of ethanesulfonic acid, and 3 ml. of anhydrous isopropyl alcohol was heated on a steam bath. The resulting solution was allowed to cool slowly and the white solid which separated from solution was collected on a filter, washed with isopropyl alcohol and with diethyl ether, and dried. There was thus obtained 1.12 g. of 1,1'-hexamethylenebis[5- (4- ethylmercaptophenyl)biguanide] di(ethanesulfonate), having the molecular formula $C_{26}H_{40}N_{10}S_2 \cdot 2C_2H_6SO_3$, which melted at 175–180° C. This salt was soluble in water at 25° C. to the extent of at least 1 percent.

G. Using a procedure similar to that in part F above, 1 g. of 1,1'-hexamethylenebis[5-(4-ethylmercaptophenyl)- biguanide] was interacted with 0.350 g. of methanesulfonic acid to yield 1.06 g. of 1,1'-hexamethylenebis[5-(4-ethylmercaptophenyl)biguanide] di(methanesulfonate), having the molecular formula $C_{26}H_{40}N_{10}S_2 \cdot 2CH_4SO_3$, which melted over a wide range, from 80–150° C. This salt was soluble in water at 25° C. to the extent of at least 1 percent.

H. By interacting 28 g. of 1,1'-hexamethylenebis[5-(4-ethylmercaptophenyl-biguanide] with 18 g. of cyclohexanesulfamic acid in one liter of methanol there was obtained 33.1 g. of 1,1'-hexamethylenebis[5-(3-ethylmercaptophenyl)biguanide] di(cyclohexanesulfamate), having the molecular formula $C_{26}H_{40}N_{10}S_2 \cdot 2(C_6H_{13}NO_3S)$, as a white solid which melted at 186° C.

I. By interacting 20 g. of 1,1'-hexamethylenebis[5-(4-ethylmercaptophenyl)biguanide] with 25.6 g. of 2,2'-thiobis(4,6-dichlorophenol) in 100 ml. of methanol there was obtained 39.2 g. of the di-2,2'-thiobis(4,6-dichlorophenol) salt of 1,1'-hexamethylenebis[5-(4-ethylmercaptophenyl)- biguanide], having the molecular formula

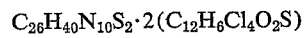

$$C_{26}H_{40}N_{10}S_2 \cdot 2(C_{12}H_6Cl_4O_2S)$$

as a yellow powder which melted at 95–99° C.

EXAMPLE 14

*1,1'-hexamethylenebis[5-(3-ethylmercaptophenyl)biguanide]*

Following the same procedure as that described in part A of Example 13, but substituting 32.2 g. of 3-ethylmercaptoaniline hydrochloride for the 4-ethylmercaptoaniline hydrochloride, there is obtained as the reaction product the dihydrochloride of 1,1'-hexamethylenebis[5-(3-ethylmercaptophenyl)biguanide] (Formula I: $R^2$=H;

R—X—=3-$C_2H_5$—S—

Y=H; Z=H; n=6). By treating this salt with two equivalents of sodium hydroxide, there is obtained the corresponding free base, 1,1'-hexamethylenebis[5-(3-ethylmercaptophenyl)biguanide]. When treated with two equivalents of sulfamic acid, this base is converted to its disulfamate salt.

1,1'-hexamethylenebis[5-(4-isopropylmercaptophenyl)biguanide] dihydrochloride is obtained by interacting 1,1'-hexamethylenebis(3-cyanoguanidine) and 4-isopropylmercaptoaniline hydrochloride, using the manipulative procedure of part A of Example 13.

EXAMPLE 15

*1,1'-hexamethylenebis[5-(4-ethylsulfinylphenyl)biguanide]*

By treatment of a slurry of 19.6 g. of 1,1'-hexamethylenebis[5-(4-ethylmercaptophenyl)biguanide] dihydrochloride in 70 ml. of water at room temperature with 6.2 ml. of 30 percent hydrogen peroxide solution (containing 0.336 g. of hydrogen peroxide per ml. of solution), there was obtained 11 g. of the dihydrochloride of 1,1'-hexamethylenebis[5-(4-ethylsulfinylphenyl)biguanide] (Formula I: $R^2$=H; R—X—=4-$C_2H_5$—SO—; Y=H; Z=H; n=6), having the molecular formula $C_{26}H_{40}N_{10}O_2S_2 \cdot 2HCl$ as a white solid which melted at 244–245° C. Treatment of this salt with two molecular equivalents of sodium hydroxide yields the free base, 1,1'-hexamethylenebis[5-(4-ethylsulfinylphenyl)biguanide]. This base interacts with two equivalents of hydriodic acid to yield the dihydroiodide salt.

EXAMPLE 16

*1,1'-hexamethylenebis[5-(4-ethylsulfonylphenyl)biguanide]*

A. To a slurry of 31.2 g. of 1,1'-hexamethylenebis[5-(4-ethylmercaptophenyl)biguanide] dihydrochloride in 150 ml. of water at room temperature (about 25° C.), there was added dropwise 41.3 ml. of 40 percent peracetic acid, an ice bath being used as necessary to keep the temperature of the reaction mixture from rising above 40° C. The reaction mixture was stirred at room temperature for several hours. Decolorizing charcoal was added, and the mixture was filtered. The filtrate was chilled and 300 ml. of saturated aqueous sodium chloride solution was added to it. The gum which separated from solution was collected and washed with 100 ml. of saturated aqueous sodium chloride solution. The gum was dissolved in methyl alcohol, decolorizing charcoal was added, and the mixture was filtered. Anhydrous calcium sulfate and decolorizing charcoal were added to the filtrate, and the mixture was filtered. The solvent was evaporated from the filtrate under reduced pressure to yield 34.8 g. of a foamy solid residue. This product was the dihydrochloride of 1,1'-hexamethylenebis[5-(4-ethylsulfonylphenyl)biguanide] (Formula I: $R^2$=H; R—X—=4-$C_2H_5$—$SO_2$—; Y=H; Z=H; n=6), having the molecular formula $C_{26}H_{40}N_{10}O_4S_2 \cdot 2HCl$.

B. The 1,1'-hexamethylenebis[5-(4-ethylsulfonylphenyl)biguanide] dihydrochloride was dissolved in methyl alcohol, decolorizing charcoal was added, and the mixture was filtered. The filtrate was chilled and 8 ml. of 35 percent aqueous sodium hydroxide solution was added. The solid which precipitated from solution was collected on a filter, washed with water and with anhydrous diethyl ether, and dried at 50° C. for several hours. The dry solid, which weighed 23.3 g., and was dissolved in 480 ml. of hot N,N-dimethylformamide, decolorizing charcoal was added, and the mixture was filtered. The filtrate was chilled, sufficient water was added to initiate crystallization, and the mixture was chilled for several hours. The solid which separated from solution was collected on a filter and dried. There was thus obtained 14.5 g. of off-white powder which melted at 197–198° C. This product was 1,1'-hexamethylenebis[5-(4-ethylsulfonylphenyl)biguanide] (Formula I: $R^2$=H;

R—X—=4-$C_2H_5$—$SO_2$—

Y=H; Z=H; n=6), having the molecular formula $C_{26}H_{40}N_{10}O_4S_2$. A further crop of 2.5 g. of the base was recovered from the filtrate from collection of the first crop.

This base was soluble at 25° C. in a mixture of equal volumes of water and 0.5 N aqueous hydrochloric acid solution to the extent of 5 percent. The pH of a 1 percent solution in the dilute acid solution was 2.1.

EXAMPLE 17

*1,1'-hexamethylenebis[5-(3-ethylsulfonylphenyl)biguanide]*

Following the same procedure as that described in part A of Example 16, but substituting 31.2 g. of 1,1'-hexamethylenebis[5-(3-ethylmercaptophenyl)biguanide] dihydrochloride for the 1,1'-hexamethylenebis[5-(4-ethylmercaptophenyl)biguanide] dihydrochloride, there is obtained as the reaction product the dihydrochloride of 1,1'-hexamethylenebis[5-(3-ethylsulfonylphenyl)biguanide] (Formula I: $R^2$=H; R—X—=3-$C_2H_5$—$SO_2$—; Y=H; Z=H; n=6). By treating this salt with two equivalents of sodium hydroxide, there is obtained the corresponding free base, 1,1'-hexamethylenebis[5-(3-ethylsulfonylphenyl)biguanide]. When treated with two equivalents of benzoic acid, this base is converted to its dibenzoate salt.

EXAMPLE 18

*1,1'-decamethylenebis[5-(4-ethylmercaptophenyl)biguanide]*

A. By substituting 8.32 g. of 4-ethylmercaptoaniline for the 4-methylmercaptoaniline in part A of Example 3, there is obtained as the reaction product 1-(4-ethylmercaptophenyl)-3-cyanoguanidine (Formula V: $R^2$=H; R—X—=4-$C_2H_5$—S—; Y=H; Z=H; n=10).

B. Interaction of 1-(4-ethylmercaptophenyl)-3-cyanoguanidine with decamethylenediamine dihydrochloride in nitrobenzene, following the procedure of part B of Example 3, yields the dihydrochloride of 1,1'-decamethylenebis[5-(4-ethylmercaptophenyl)biguanide] (Formula I: $R^2$=H; R—X—=4-$C_2H_5$—S—; Y=H; Z=H; n=10).

EXAMPLE 19

*1,1'-dodecamethylenebis[5-(4-ethylmercaptophenyl)biguanide]*

Following the procedure of part A of Example 1, but substituting an equimolar quantity of 1,1'-dodecamethylenebis(3-cyanoguanidine) for the 1,1'-hexamethylenebis(3-cyanoguanidine), there is obtained the dihydrochloride of 1,1'-dodecamethylenebis[5-(4-ethylmercaptophenyl)biguanide] (Formula I: $R^2$=H;

R—X—=4-$C_2H_5$—S—

Y=H; Z=H; n=12). This salt is converted to the free base, 1,1'-dodecamethylenebis[5-(4-ethylmercaptophenyl)biguanide], by treatment with two molecular equivalents of sodium hydroxide.

EXAMPLE 20

*1,1'-dodecamethylenebis[5-(4-ethylsulfonyl-phenyl)biguanide]*

Following the same procedure as that described in part A of Example 16, but substituting 35.0 g. of 1,1'-dodecamethylenebis[5 - (4-ethylmercaptophenyl)biguanide] for the 1,1'-hexamethylenebis[5-(4-ethylmercaptophenyl)biguanide], there is obtained as the reaction product the dihydrochloride of 1,1'-dodecamethylenebis[5-(4-ethylsulfonylphenyl)biguanide] (Formula I: $R^2$=H; R—X—=4-$C_2H_5$—$SO_2$—; Y=H; Z=H; $n$=12). By treating this salt with sodium hydroxide, there is obtained the corresponding free base, 1,1'-dodecamethylenebis[5-(4-ethylsulfonylphenyl)biguanide]. When treated with two equivalents of nicotinic acid, this base is converted to its dinicotinate salt.

EXAMPLE 21

*1,1'-hexamethylenebis[5-(4-n-propylmercapto-phenyl)biguanide]*

A. A mixture of 20 g. of 1,1'-hexamethylenebis(3-cyanoguanidine) and 34.5 g. of 4-n-propylmercaptoaniline hydrochloride in 270 ml. of 2-ethoxyethanol was refluxed on an oil bath. While the mixture was being warmed up, all of the solid went into solution and shortly thereafter when a solid began to separate from solution another 50 ml. portion of 2-ethoxyethanol was added. After a total period of refluxing of two hours, the reaction mixture was chilled and then filtered to collect the solid which had separated. This solid was washed with 2-ethoxyethanol and air-dried at room temperature. The dry solid, which weighed 41.7 g., was stirred in 130 ml. of cold water, and the resulting slurry was filtered. The collected solid was air-dried at room temperature. The 36 g. of solid thereby obtained was recrystallized from 144 ml. of 50 percent aqueous acetic acid solution, using decolorizing charcoal. The filtrate was chilled and occasionally stirred. The cream-colored solid which separated from solution was collected on a sintered glass filter in a cold room, and the collected solid was sucked partially dry, then air-dried for several days, and finally dried at 80° C. under reduced pressure (17 mm.) for eight hours. There was thus obtained 20 g. of cream-colored powder which melted at 238–240° C. This product was the dihydrochloride of 1,1'-hexamethylenebis[5-(4-n-propylmercaptophenyl)biguanide] (Formula I: $R^2$=H; R—X—=4-$CH_3CH_2CH_2$—S—; Y=H, Z=H; $n$=6), having the molecular formula $C_{28}H_{44}N_{10}S_2 \cdot 2HCl$. The water solubility of this compound was less than 0.25 percent at 25° C., and its solubility in ethyl alcohol was less than 1 percent (weight/volume).

B. 203 g. of 1,1'-hexamethylenebis[5-(4-n-propylmercaptophenyl)biguanide] dihydrochloride was slurried in 2030 ml. of methyl alcohol and the mixture was refluxed on a steam bath. To the refluxing mixture there was gradually added during a period of five minutes 50 ml. of 35 percent aqueous sodium hydroxide solution. The resulting solution was treated with decolorizing charcoal and filtered through Filter-Cel. The filtrate was chilled with occasional stirring, and the light tan solid which separated from solution was collected on a filter, washed with cold methyl alcohol, and sucked dry on the filter. The collected solid, which weighed 148.5 g., was recrystallized from 445 ml. of benzene, using decolorizing charcoal, and the product was dried at 65° C. under reduced pressure (17 mm.) for eight hours. There was thus obtained 103 g. of cream colored solid which melted at 124–133° C. and had a faint garlic-like odor. This product was 1,1'-hexamethylenebis[5-(4-n-propylmercaptophenyl)biguanide] (Formula I: $R^2$=H; R—X—=4-$CH_3CH_2CH_2$—S—; Y=H; Z=H; $n$=6), having the molecular formula $C_{28}H_{44}N_{10}S_2$. The solubility of this compound in water was less than 0.25 percent at 25° C. and its solubility in ethyl alcohol at 25° C. was less than 1 percent. It was readily soluble in aqueous lactic acid solution.

C. A mixture of 139.3 g. of 1,1'-hexamethylenebis[5-(4-n-propylmercaptophenyl)biguanide], 53.3 g. of 85.2 percent lactic acid, and 280 ml. of water was heated and stirred until most of the solid had dissolved. The hot mixture was filtered, and the filtrate was chilled in a refrigerator. The solid which separated from the solution was collected on a filter, washed with cold water, and sucked partially dry on the filter. The damp solid was recrystallized from 344 ml. of water, using decolorizing charcoal. There was thus obtained 103 g. of white powder which melted at 97–105° C. and had a faint garlic-like odor. This product was 1,1'-hexamethylenebis[5-(4-n-propylmercaptophenyl)biguanide] di-*dl*-lactate, having the molecular formula $C_{28}H_{44}N_{10}S_2 \cdot 2C_3H_6O_3$. The solubility of this compound in water at 25° C. was less than 0.25 percent; it was soluble to the extent of about 1 percent in warm water, and did not separate readily when the warm solution was cooled. It was soluble to the extent of 5 percent (weight/volume) in ethyl alcohol; and it was precipitated from a 5 percent solution in ethyl alcohol by addition of four volumes of water.

D. A mixture of 2 g. of 1,1'-hexamethylenebis[5-(4-n-propylmercaptophenyl)biguanide] and 2 ml. of glacial acetic acid was warmed on a steam bath, and to the resulting solution there was added with stirring 50 ml. of anhydrous diethyl ether. After the mixture had stood for two hours, it was filtered. The white solid thus collected was washed with diethyl ether and dried, and was then mixed with 10 ml. of anhydrous diethyl ether and allowed to stand overnight. The mixture was then filtered, and the solid thus collected was washed with anhydrous ethyl ether and dried. There was obtained 2.05 g. of white solid which melted at 190–195° C. with decomposition. This product was 1,1'-hexamethylenebis[5-(4-n-propylmercaptophenyl)biguanide] diacetate, having the molecular formula $C_{28}H_{44}N_{10}S_2 \cdot 2C_2H_4O_2$. This salt was readily soluble in warm water.

In mice, the $LD_{50}$ of the dilactate was greater than 8000 mg./kg. (twenty-four hour test) and approximately 7000 mg./kg. (seven day test) orally and approximately 11 mg./kg. intravenously.

EXAMPLE 22

*1,1'-hexamethylenebis[5-(4-n-propylsulfonylphenyl)biguanide]*

A. To a slurry of 46.4 g. of 1,1'-hexamethylenebis[5-(4-n-propylmercaptophenyl)biguanide] dihydrochloride in 232 ml. of water at room temperature there was added dropwise 46.3 ml. of 40 percent peracetic acid, the reaction mixture being cooled to keep the temperature from rising above 40° C. After addition of the peracetic acid was completed, the reaction mixture was stirred for one hour at room temperature and was then filtered to remove a small amount of insoluble material which was discarded. The filtrate was stirred at room temperature for two hours and at 0° C. for one hour. To the clear reaction solution there was added 250 ml. of saturated aqueous sodium chloride solution, whereupon a pink gum precipitated. The liquid was decanted away from the gum, and after washing the gum with 50 ml. of saturated aqueous sodium chloride solution it was dissolved in methyl alcohol. Decolorizing charcoal was added to the solution, which was then filtered. The filtrate was dried over anhydrous calcium sulfate, and after removal of the drying agent the solvent was evaporated from the solution under reduced pressure to yield as a residue 58.5 g. of the dihydrochloride of 1,1'-hexamethylenebis[5-(4-n-propylsulfonylphenyl)biguanide] (Formula I: $R^2$=H;

R—X—=4-$CH_3CH_2CH_2$—$SO_2$—; Y=H; Z=H; $n$=6)

as a light pink paste. Just sufficient methyl alcohol to dissolve the paste was added, and to the resulting solution was added 13 ml. of 35 percent aqueous sodium hydroxide solution. The resulting mixture was chilled and the solid which separated from solution was collected on a filter and washed with methyl alcohol and with anhydrous diethyl ether. The solid was then dried at 65° C. in a vacuum oven for four hours. There was thus obtained 41.2 g. of cream colored powder which melted at 200–201° C. with decomposition. This product was 1,1'-hexamethylenebis[5 - (4 - n - propylsulfonylphenyl)biguanide] (Formula I: $R^2$=H;

Y=H; Z=H; n=6), having the molecular formula $C_{28}H_{44}N_{10}O_4S_2$. This compound was soluble to the extent of 10 percent in dilute hydrochloric acid. When 0.1 N aqueous sodium hydroxide solution was added to a 1 percent solution of pH 2.1 in dilute hydrochloric acid, a precipitate formed at pH 3.3.

EXAMPLE 23

*1,1'-hexamethylenebis[5-(4-n-butylmercaptophenyl)-biguanide]*

A. A mixture of 12 g. of 1,1'-hexamethylenebis(3-biscyanoguanidine), 22.2 g. of 4-n-butylmercaptoaniline hydrochloride and 88 ml. of 2-ethoxyethanol was stirred and heated to reflux temperature on an oil bath. During this heating period, all of the solid dissolved, and shortly thereafter a heavy tan precipitate came out of solution. A 40 ml. portion of 2-ethoxyethanol was added to the mixture to facilitate stirring. After a total period of two hours of refluxing, the reaction mixture was chilled and filtered. The tan solid thus collected was washed with cold 2-ethoxyethanol and sucked partially dry on the filter. The damp solid was slurried in cold water, the slurry was filtered, and the collected solid was air-dried at room temperature. The resulting product, which weighed 25 g., was recrystallized from 360 ml. of 50 percent aqueous acetic acid solution, using decolorizing charcoal, to yield 19 g. of white powder which melted at 251–253° C. This product was the dihydrochloride of 1,1'-hexamethylenebis[5 - (4 - n - butylmercaptophenyl)biguanide] (Formula I:

$R^2$=H; R—X—=4-$CH_3CH_2CH_2CH_2$—S—; Y=H; Z=H; n=6)

having the molecular formula $C_{30}H_{48}N_{10}S_2 \cdot 2HCl$. The solubility of this compound in water at 25° C. was less than 0.25 percent, and its solubility in ethyl alcohol at 25° C. was less than 1 percent (weight/volume).

B. A slurry of 126.5 g. of 1,1'-hexamethylenebis[5-(4-n-butylmercaptophenyl)biguanide] dihydrochloride in 1265 ml. of methyl alcohol was heated to reflux temperature on a steam bath, and then 31.6 ml. of 35 percent aqueous sodium hydroxide solution was gradually added over a period of five minutes. The resulting solution was treated with decolorizing charcoal and filtered through Filter-Cel, and the filtrate was chilled. The solid which separated from solution was collected on a filter. This product, which weighed 99 g., was recrystallized from 400 ml. of methyl alcohol, using decolorizing charcoal, to yield 83 g. of cream colored solid which melted at 107–109° C. and had a faint garlic-like odor. This product was 1,1'-hexamethylenebis[5-(4-n-butylmercaptophenyl) biguanide] (Formula I:

$R^2$=H; R—X—=4-$Ch_3CH_2CH_2CH_2$—S—; Y=H; Z=H; n=6)

having the molecular formula $C_{30}H_{48}N_{10}S_2$. The solubility of this compound in water at 25° C. was less than 0.25 percent, and its solubility in ethyl alcohol was less than 1 percent (weight/volume). It was very soluble in aqueous lactic acid solution.

C. To a mixture of 147 g. of 1,1'-hexamethylenebis[5-(4-n-butylmercaptophenyl) biguanide] and 250 ml. of anhydrous isopropyl alcohol there were added 60.2 g. or 85.2 percent racemic lactic acid and 265 ml. of anhydrous isopropyl alcohol. The resulting mixture was heated on a steam bath until practically all of the solid had dissolved. The hot reaction mixture was filtered, and the filtrate was chilled in a refrigerator for three days. The solid which had separated from solution was collected on a filter, washed with cold anhydrous isopropyl alcohol, and dried, first at room temperature and then for eight hours at 60° C. under reduced pressure. There was thus obtained 82 g. of white powder which melted at 130–133° C. and had a faint garlic-like odor. This product was 1,1'-hexamethylenebis[5-(4-n-butylmercaptophenyl)-biguanide] di-*dl*-lactate, having the molecular formula $C_{30}H_{48}N_{10}S_2 \cdot 2C_3H_6O_3$. This compound was soluble in water at 25° C. to the extent of 10 percent. The pH of a 1 percent aqueous solution was 6.5; when this solution was adjusted to pH 7.0 by addition of 0.1 N aqueous sodium hydroxide solution, no precipitate was formed.

In mice, the $LD_{50}$ of this compound was approximately 11 mg./kg. intravenously, and greater than 4000 mg./kg. orally.

EXAMPLE 24

*1,1'-hexamethylenebis[5-(4-n-butylsulfonylphenyl) biguanide]*

To a stirred slurry of 61.1 g. of 1,1'-hexamethylenebis[5-(4-n-butylmercaptophenyl)biguanide] in 306 ml. of water at room temperature there was added dropwise 59 ml. of 40 percent peracetic acid. During this addition, the temperature of the reaction mixture was maintained below 40° C. by means of cooling with an ice-bath. After the addition of the peracetic acid was completed, the reaction mixture was stirred at room temperature for four hours. Another portion (14.7 ml.) of 40 percent peracetic acid was then added and the mixture was stirred for several hours more. The reaction mixture was cooled and stirred at 0° C., and 300 ml. of saturated aqueous sodium chloride solution was added, thereby causing separation of a pink gum. The supernatant liquid was decanted from this gum and after washing with 100 ml. of saturated aqueous sodium chloride solution it was dissolved in methyl alcohol. Decolorizing charcoal was added to the alcoholic solution and the resulting mixture was filtered. The filtrate was dried over anhydrous calcium sulfate, and the dried solution was mixed with decolorizing charcoal and filtered. The solvent was evaporated from the filtrate under reduced pressure, thus yielding 80.1 g. of pink gum as a residue. This product was the dihydrochloride of 1,1'-hexamethylenebis[5-(4-n-butylsulfonylphenyl)biguanide] (Formula I: $R^2$=H; R—X—=4-$CH_3CH_2CH_2CH_2$—$SO_2$—; Y=H; Z=H; n=6), having the molecular formula $C_{30}H_{48}N_{10}O_4S_2 \cdot 2HCl$ This salt was dissolved in the minimum amount of methyl alcohol and the resulting solution was filtered to remove a small amount of insoluble material. The filtrate was stirred and cooled in an ice-bath, and 16 ml. of 35 percent queous sodium hydroxide solution was added. The solid which separated from solution was collected on a filter, washed with water and with anhydrous diethyl ether, and dried for several hours at 70° C. in an oven. The resulting solid, which weighed 47.3 g., was dissolved in 5.2 volumes of hot, N,N-dimethylformamide, and after adding water the solution was cooled. The solid which separated from solution was collected on a filter and dried. There was thus obtained 25.6 g. of product. A 10.2 g. crop of product was recovered from the mother-liquor above. The two crops were combined and recrystallized from N,N-dimethylformamide-water to yield 25.4 g. of solid which melted at 183–185° C. This prodduct was 1,1′-hexamethylenebis-[5-(4-n-butylsulfonylphenyl))biguanide] (Formula I: $R^2=H$;

R—X—=4-CH$_3$CH$_2$CH$_2$CH$_2$—SO$_2$—

Y=H; Z=H; n=6), having the molecular formula C$_{30}$H$_{48}$N$_{10}$O$_4$S$_2$. The solubility of this base in a mixture of 0.50 ml. of 0.5 N hydrochloric acid and 19.50 ml. of water at 25° C. was less than 0.25 percent; and its solubility in ethyl alcohol at 25° C. was less than 1 percent.

EXAMPLE 25

*1,1′-hexamethylenebis[5-(4-n-amylmercaptophenyl) biguanide]*

A. A mixture of 26 g. of 1,1′-hexamethylenebis(3-cyanoguanidine), 51 g. of 4-n-amylmercaptoaniline hydrochloride, and 510 ml. of 2-ethoxyethanol was refluxed for two hours. During this period, all of the solids dissolved to produce a dark red solution, and then a precipitate separated. After completion of the reflux period, the reaction mixture was chilled and then filtered. The pink solid thus collected, which weighed 50.5 g., was slurried with water, the slurry was filtered, and the solid thus collected was sucked dry on the filter. This product, which weighed 49 g., was recrystallized from 1470 ml. of 50 percent aqueous acetic acid solution, using decolorizing charcoal, to yield 37.9 g. of cream-colored solid which melted at 242–246° C. This product was the dihydrochloride of 1,1′-hexamethylenebis[5-(4-n-amylmercaptophenyl)biguanide] (Formula I: $R^2=H$;

R—X—=4-CH$_3$CH$_2$CH$_2$CH$_2$CH$_2$—S—

Y=H; Z=H; n=6), having the molecular formula

C$_{32}$H$_{52}$N$_{10}$S$_2$.2HCl

The solubility of this compound in water at 25° C. was less than 0.25 percent, and its solubility in ethyl alcohol was less than 1 percent (weight/volume).

When this compound was tested for in vitro antibacterial and antifungal activity, the respective maximum effective aqueous dilutions showing fungistatic (Fs) or fungicidal (Fc) activity against the indicated test organisms were as follows:

*Trichophyton mentagrophytes:* Fs=1–10,000; Fc=1–10,000;
*Aspergillus niger:* Fs=1–10,000; Fc=1–10,000;
*Monilia albicans:* Fs=1–10,000; Fc=1–10,000.

This compound was active in vitro against rabies, meningo-pneumonitis, and feline pneumonitis viruses.

B. By interaction of the dihydrochloride obtained above with two equivalents of sodium hydroxide, there is obtained the free base, 1,1′-hexamethylenebis[5-(4-n-amylmercaptophenyl)biguanide].

EXAMPLE 26

*1,1′-hexamethylenebis[5-(4-n-hexylmercaptophenyl) biguanide]*

By interacting 10 g. of hexamethylenebis(3-cyanoguanidine) with 21 g. of 4-n-hexylmercaptoaniline hydrochloride in 200 ml. of 2-ethoxyethanol, using a procedure similar to that described in part A of Example 25 above, there was obtained as the reaction product 8.3 g. of the dihydrochloride of 1,1′-hexamethylenebis[5-(4-n-hexylmercaptophenyl)biguanide] (Formula I: $R^2=H$;

R—X—=4-CH$_3$CH$_2$CH$_2$CH$_2$CH$_2$CH$_2$—S—

Y=H; Z=H; n=6), having the molecular formula C$_{34}$H$_{56}$N$_{10}$S$_2$.2HCl, as a white solid which melted at 235–237° C. Treatment of this salt with two equivalents of sodium hydroxide yields the corresponding free base, 1,1′-hexamethylenebis[5-(4 - n - hexylmercaptophenyl)biguanide], having the molecular formula C$_{34}$H$_{56}$N$_{10}$S$_2$.

EXAMPLE 27

*1,1′-hexamethylenebis[5-(4-n-octadecylmercaptophenyl) biguanide]*

Following the same procedure as that described in part A of Example 1, but substituting an equimolar quantity of 4-n-octadecylmercaptoaniline hydrochloride for the 4-methylmercaptoaniline hydrochloride, there is obtained as the reaction product the dihydrochloride of 1,1′-hexamethylenebis[5 - (4 - n - octadecylmercaptophenyl) biguanide] (Formula I: $R^2=H$;

R—X—=4-CH$_3$(CH$_2$)$_{17}$—S—

Y=H; Z=H; n=6). By treating this salt with two equivalents of sodium hydroxide, there is obtained the corresponding free base, 1,1′-hexamethylenebis[5-(4-n-octadecylmercaptophenyl)biguanide]. When treated with two equivalents of acetic acid, this base is converted to its diacetate salt.

EXAMPLE 28

*1,1′-hexamethylenebis[5-(4-methylmercapto-3-chlorophenyl)biguanide]*

A. A mixture of 38 g. of 4-methylmercapto-3-chloroaniline hydrochloride, 23.4 g. of 1,1′-hexamethylenebis-(3-cyanoguanidine), and 127 ml. of 2-ethoxyethanol was stirred and refluxed at 130° C. for fifteen minutes. Decolorizing charcoal was then added, and the reaction mixture was filtered while still hot. The filtrate thus obtained was distilled under reduced pressure to remove the 2-ethoxyethanol. The semi-solid thus obtained was stirred in 150 ml. of n-butyl alcohol and the mixture was filtered, using a steam-heated filter and coarse filter paper. The solid collected in this manner was dried at 100° C. in a vacuum oven. The dry solid, which weighed 36.3 g., was dissolved in anhydrous methyl alcohol and after addition of animal charcoal the mixture was filtered. The filtrate was diluted with anhydrous diethyl ether and the solid which separated from solution was collected on a filter. There was obtained in this manner 16.2 g. of solid which melted at 222–225° C. This product was the dihydrochloride of 1,1′-hexamethylenebis[5-(4-methylmercapto-3-chlorophenyl)biguanide] (Formula I: $R^2=H$; R—X—=4-CH$_3$—S—; Y=3-Cl; Z=H; n=6). The solubility of this compound in water at 25° C. was less than 0.25 percent, and its solubility in ethyl alcohol at 25° C. was less than 1 percent (weight/volume).

When this compound was tested for in vitro antibacterial and antifungal activity, the respective maximum effective aqueous dilutions showing the bacteriostatic (Bs), bactericidal (Bc), fungistatic (Fs) or fungicidal (Fc) activity against the indicated test organisms were as follows:

*Staphylococcus aureus* 209: Bs=1–1,000,000; Bc=1–400,000;
*Eberthella typhi*, Hopkins: Bs=1–1,000,000; Bc=1–200,000;
*Pseudomonas aeruginosa*: Bs=1–130,000; Bc=1–40,000:
*Clostridium welchii*, M: Bs=1–1,200,000; Bc=1–200,000;
*Trichophyton mentagrophytes*: Fs=1–100,000; Fc=1–100,000;
*Aspergillus niger*: Fs=1–10,000; Fc=less than 1–1,000;
*Monilia albicans*: Fs=1–100,000; Fc=1–10,000.

B. Interaction of the dihydrochloride obtained above with two equivalents of sodium hydroxide yields the free base, 1,1′-hexamethylenebis[5-(4-methylmercapto-3-chlorophenyl)biguanide] (Formula I: $R^2=H$; R—X—= 4-CH$_3$—S—; Y=3-Cl; Z=H; n=6), having the molecular formula C$_{24}$H$_{34}$Cl$_2$N$_{10}$S$_2$, as an off-white solid which melted at 160–161° C. This free base interacts with formic acid, citric acid, gluconic acid, and 3-hydroxy-2-naphthalenecarboxylic acid to yield respectively the formate, citrate, gluconate, and 3-hydroxy-2-naphthalenecarboxylate di-acid addition salt of the base. By interacting 50 g. of the free base with 20 g. of lactic acid (85.2 percent) in 115 ml. of boiling isopropyl alcohol, there was obtained 58.5 g. of 1,1'-hexamethylenebis[5-(4-methylmercapto-3-chlorophenyl)biguanide] dilactate di-(2-propanolate), having the molecular formula $$C_{24}H_{34}Cl_2N_{10}S_2 \cdot 2C_3H_6O_3 \cdot 2C_3H_8O$$

as a cream-colored solid which melted at 103–108° C. (dec.); this salt was soluble in water to the extent of 20 percent, the pH of the 1 percent aqueous solution being 6.1.

EXAMPLE 29

*1,1'-pentamethylenebis[5-(4-methylmercapto-3-fluorophenyl)biguanide]*

Following the same procedure as that described in part A of Example 28, but substituting 35.0 g. of 4-methylmercapto-3-fluoroaniline hydrochloride for the 4-methylmercapto-3-chloroaniline hydrochloride and 22.2 g. of 1,1'-pentamethylenebis(3-cyanoguanidine) for the 1,1'-hexamethylenebis(3-cyanoguanidine) there is obtained as the reaction product the dihydrochloride of 1,1'-pentamethylenebis[5 - (4 - methylmercapto - 3 - fluorophenyl)-biguanide] (Formula I: $R^2$=H; R—X—=4-CH$_3$—S—; Y=3-F; Z=H; n=5). By treating this salt with sodium hydroxide, there is obtained the free base, and by the manipulative procedure of part D of Example 1, this base is converted to its diacetate salt.

EXAMPLE 30

*1,1'-hexamethylenebis[5-(4-ethylmercapto-3-chlorophenyl)biguanide]*

A. A mixture of 37 g. of 1,1'-hexamethylenebis(3-cyanoguanidine), 64.1 g. of 4-ethylmercapto-3-chloroaniline hydrochloride, and 300 ml. of 2-ethoxyethanol was refluxed at 130° C. for twenty minutes. Decolorizing charcoal was added and the reaction mixture was filtered while still hot. The 2-ethoxyethanol was distilled from the filtrate under reduced pressure. The 144 g. of pink, pasty solid obtained as a residue was slurried in 1200 ml. of isoamyl alcohol and, after removal of a small amount of gummy material which had not dissolved, the mixture was cooled and filtered to collect 21.9 g. of off-white powder which melted at 214–215° C. This product was the dihydrochloride of 1,1'-hexamethylenebis[5-(4-ethylmercapto-3-chlorophenyl)biguanide] (Formula I: $R^2$=H; R—X—=4-C$_2$H$_5$—S—; Y=3-Cl; Z=H; n=6), having the molecular formula $C_{26}H_{38}Cl_2N_{10}S_2 \cdot 2HCl$. The solubility of this salt in water at 25° C. was less than 0.25 percent, and its solubility in ethyl alcohol at 25° C. was less than 1 percent (weight/volume).

B. By interaction with two equivalents of sodium hydroxide, the dihydrochloride above is converted to the free base, 1,1'-hexamethylenebis[5-(4-ethylmercapto-3-chlorophenyl)biguanide]. This base reacts with two equivalents of hydrobromic acid to yield the dihydrobromide salt of the base.

EXAMPLE 31

*1,1'-hexamethylenebis[5-(2-methylmercapto-5-chlorophenyl)biguanide]*

By interacting 25 g. of 1,1'-hexamethylenebis(3-cyanoguanidine) and 42 g. of 2-methylmercapto-5-chloroaniline hydrochloride, there is obtained the dihydrochloride of 1,1'-hexamethylenebis[5 - (2 - methylmercapto - 5 - chlorophenyl)biguanide] (Formula I: $R^2$=H; R—X—= 2-CH$_3$—S—; Y=5-Cl; Z=H; n=6). This salt is converted to the free base, 1,1'-hexamethylenebis[5-(2-methylmercapto-5-chlorophenyl)biguanide], by treatment with two molecular equivalents of sodium hydroxide.

EXAMPLE 32

*1,1'-hexamethylenebis[5-(4-n-propylmercapto-3-chlorophenyl)biguanide]*

A mixture of 31 g. of 1,1'-hexamethylenebis(3-cyanoguanidine), 56.8 g. of 4-n-propylmercapto-3-chloroaniline hydrochloride, and 250 ml. of 2-ethoxyethanol was stirred and refluxed for twenty minutes. Decolorizing charcoal was then added and the mixture was filtered while still hot. The solvent was evaporated from the filtrate under reduced pressure. The 126.5 g. of pasty, pink solid obtained as a residue was slurried in 8.5 volumes of isoamyl alcohol, and the slurry was filtered. The collected solid was washed with diethyl ether and dried. The dry solid, which weighed 48.8 g., was ground and slurried in anhydrous diethyl ether, the slurry was filtered, and the collected solid was washed with anhydrous diethyl ether and dried. There was thus obtained 47.2 g. of pink powder which melted at 226–228° C. This product was the dihydrochloride of 1,1'-hexamethylenebis[5-(4 - n - propylmercapto - 3 - chlorophenyl)biguanide] (Formula I: $R^2$=H;

R—X—=4-CH$_3$CH$_2$CH$_2$—S—

Y=3-Cl; Z=H; n=6), having the molecular formula $C_{28}H_{42}Cl_2N_{10}S_2 \cdot 2HCl$. The solubility of this salt in water at 25° C. was less than 0.25 percent; and its solubility in ethyl alcohol was less than 1 percent.

Interaction of the dihydrochloride above with two equivalents of sodium hydroxide yields the free base, 1,1'-hexamethylenebis[5-(4-n-propylmercapto - 3 - chlorophenyl)biguanide].

EXAMPLE 33

*1,1'-tetramethylenebis[5-(4-n-propylsulfinyl-3-chlorophenyl)biguanide]*

A. A slurry of 20 g. of 4-n-propylmercapto-3-chloroaniline hydrochloride in 280 ml. of a mixture (by volume) of 3 parts of acetic acid and one part of water was warmed on a steam bath until all of the solid had dissolved; this required about five minutes. The resulting light brown solution was cooled to 20–25° C. and then 8.5 ml. of 30 percent hydrogen peroxide solution (which contained 0.336 g. of hydrogen peroxide per ml. of solution) was added in one portion. The mixture became dark purple but there was no temperature rise. The reaction mixture was stirred for six hours and was then allowed to stand overnight at room temperature. A few grams of palladium-on-charcoal catalyst (10 percent palladium) was added to the reaction mixture, which was again allowed to stand overnight at room temperature. Decolorizing charcoal was added to the mixture and it was filtered. The filtrate was diluted with an equal volume of water and then chilled and filtered to remove a small amount of solid which separated from solution. To the filtrate there was gradually added 35 percent aqueous sodium hydroxide solution until the mixture was strongly alkaline. Diethyl ether was added to dissolve the liquid layer of 4-n-propylsulfinyl-3-chloroaniline which separated from the alkaline aqueous solution. The mixture was filtered to remove a small amount of insoluble material. The ethereal layer in the filtrate was separated from the aqueous layer and the latter was extracted with another portion of diethyl ether. The two ethereal extracts were combined, washed with saturated aqueous sodium chloride solution, and dried over anhydrous calcium sulfate for one hour. Decolorizing charcoal was added and the mixture was filtered. The red filtrate was distilled under reduced pressure to yield 12 g. of 4-n-propylsulfinyl-3-chloroaniline as a viscous red oil. The hydrochloride is obtained by interaction of an ethereal solution of the base with one molecular equivalent of hydrogen chloride.

B. Interaction of 5.6 g. of 1,1'-tetramethylenebis(3-cyanoguanidine), 12.7 g. of 4-n-propylsulfinyl-3-chloroaniline hydrochloride in 250 ml. of 2-ethoxyethanol yields the dihydrochloride of 1,1'-tetramethylenebis[5-(4-n-propylsulfinyl-3-chlorophenyl)biguanide] (Formula I: $R^2=H$; R—X—=4-$CH_3CH_2CH_2$—SO—; Y=3-Cl; Z=H; n=4). This salt is converted to the corresponding base, 1,1'-tetramethylenebis[5-(4-n-propylsulfinyl-3-chlorophenyl)biguanide], by treatment with two molecular equivalents of sodium hydroxide.

EXAMPLE 34

*1,1'-tetramethylenebis[5-(4-n-propylsulfonyl-3-chlorophenyl)biguanide]*

Oxidation of 1,1'-tetramethylenebis[5-(4-n-propylsulfinyl-3-chlorophenyl)biguanide] dihydrochloride with 40 percent peracetic acid yields the dihydrochloride of 1,1'-tetramethylenebis[5-(4-n-propylsulfonyl-3-chlorophenyl)biguanide] (Formula I: $R^2=H$;

R—X—=4-$CH_3CH_2CH_2$—$SO_2$—

Y=3-Cl; Z=H; n=4). This salt is converted to the corresponding free base, 1,1'-tetramethylenebis[5-(4-n-propylsulfonyl-3-chlorophenyl)biguanide], by treatment with two equivalents of sodium hydroxide.

EXAMPLE 35

*1,1'-trimethylenebis[5-(4-n-hexylmercapto-3-chlorophenyl)biguanide]*

A. By substituting 10.6 g. of 4-n-hexylmercapto-3-chloroaniline for the 4-methylmercaptoaniline in part A of Example 3, there is obtained as the reaction product 1-(4-n-hexylmercapto-3-chlorophenyl)-3-cyanoguanidine (Formula V: $R^2=H$; R—X—=4-$CH_3(CH_2)_5$—S—; Y=3-Cl; Z=H).

B. Interaction of 1-(4-n-hexylmercapto-3-chlorophenyl)-3-cyanoguanidine with trimethylenediamine dihydrochloride in nitrobenzene, following the procedure of part B of Example 3, yields the dihydrochloride of 1,1'-trimethylenebis[5-(4-n-hexylmercapto-3-chlorophenyl)biguanide] (Formula I: $R^2=H$;

R—X—=4-$CH_3(CH_2)_5$—S—

Y=3-Cl; Z=H; n=3). This salt is converted to the free base, 1,1'-trimethylenebis[5-(4-n-hexylmercapto-3-chlorophenyl)biguanide], by interaction with two equivalents of sodium hydroxide.

EXAMPLE 36

*1,1'-hexamethylenebis-[5-(4-methylmercapto-3-trifluoromethylphenyl)biguanide]*

Following the same procedure as that described in part A of Example 1, but substituting an equimolar quantity of 4-methylmercapto-3-(trifluoromethyl)aniline hydrochloride for the 4-methylmercaptoaniline hydrochloride, there is obtained as the reaction product the dihydrochloride of 1,1'-hexamethylenebis[5-(4-methylmercapto-3-trifluoromethylphenyl)biguanide] (Formula I: $R^2=H$; R—X—=4-$CH_3$—S—; Y=3-$F_3C$—; Z=H; n=6). By treating this salt with two equivalents of sodium hydroxide, there is obtained the corresponding free base, 1,1'-hexamethylenebis[5-(4-methylmercapto-3-trifluoromethylphenyl)biguanide]. When treated with two equivalents of acetic acid, this base is converted to its diacetate salt.

The 4-methylmercapto-3-(trifluoromethyl)aniline hydrochloride reactant used above is conveniently obtained by chlorosulfonating 3-(trifluoromethyl)aniline to produce 2-(trifluoromethyl)-4-aminobenzenesulfonyl chloride, reducing the latter with zinc and aqueous acid or with stannous chloride to yield 4-hydrosulfido-3-(trifluoromethyl)aniline, and methylating with dimethyl sulfate.

EXAMPLE 37

*1,1'-hexamethylenebis[5-(5-methylmercapto-2-nitrophenyl)biguanide]*

Following the procedure of part A of Example 1, but substituting an equimolar quantity of 5-methylmercapto-2-nitroaniline hydrochloride for the 4-n-methylmercaptoaniline hydrochloride, there is obtained 1,1'-hexamethylenebis[5-(5-methylmercapto-2-nitrophenyl)biguanide] dihydrochloride (Formula I: $R^2=H$;

R—X—=5-$CH_3$—S—;

Y=2-$NO_2$; Z=H; n=6). Treatment of this compound with two equivalents of sodium hydroxide yields the corresponding free base, 1,1'-hexamethylenebis[5-(5-methylmercapto-2-nitrophenyl)biguanide].

EXAMPLE 38

*1,1'-hexamethylenebis[5-(2-methylmercapto-4-methoxyphenyl)biguanide]*

Following the same procedure as that described in part A of Example 1, but substituting an equimolar quantity of 2-methylmercapto-4-methoxyaniline hydrochloride for the 4-methylmercaptoaniline hydrochloride, there is obtained as the reaction product the dihydrochloride of 1,1'-hexamethylenebis[5-(2-methylmercapto-4-methoxyphenyl)biguanide] (Formula I: $R^2=H$;

R—X—=2-$CH_3$—S—;

Y=4-$CH_3$—O—; Z=H; n=6). By treating this salt with two equivalents of sodium hydroxide, there is obtained the corresponding free base, 1,1'-hexamethylenebis[5-(2-methylmercapto-4-methoxyphenyl)biguanide]. When treated with two equivalents of acetic acid, the base is converted to its diacetate salt.

EXAMPLE 39

*1,1'-hexamethylenebis[5-(4-ethylmercapto-2-methylphenyl)biguanide]*

Following the same procedure as that described in part A of Example 1, but substituting an equimolar quantity of 4-ethylmercapto-2-methylaniline hydrochloride for the 4-methylmercaptoaniline hydrochloride, there is obtained as the reaction product the dihydrochloride of 1,1'-hexamethylenebis[5-(4-ethylmercapto-2-methylphenyl)biguanide] (Formula I: $R^2=H$; R—X—=4-$C_2H_5$—S—; Y=H; Z=2-$CH_3$—; n=6). By treating this salt with two equivalents of sodium hydroxide, there is obtained the corresponding free base, 1,1'-hexamethylenebis[5-(4-ethylmercapto-2-methylphenyl)biguanide]. When treated with two equivalents of acetic acid, this base is converted to its diacetate salt.

EXAMPLE 40

*1,1'-hexamethylenebis[5-(4-n-butylsulfonyl-2,5-dimethoxyphenyl)biguanide]*

Following a procedure similar to that described in part A of Example 6, but substituting an equimolar quantity of 4-n-butylsulfonyl-2,5-dimethoxyaniline hydrochloride for the 4-methylsulfonylaniline hydrochloride, there is obtained as the reaction product the dihydrochloride of 1,1'-hexamethylenebis[5-(4-n-butylsulfonyl-2,5-dimethoxyphenyl)biguanide] (Formula I: $R^2=H$;

R—X—=4-$CH_3CH_2CH_2CH_2$—S—;

Y=2-($CH_3$—O—); Z=5-($CH_3$—O—); n=6). By treating this salt with two equivalents of sodium hydroxide, there is obtained the corresponding free base, 1,1'-hexamethylenebis[5-(4-n-butylsulfonyl-2,5-dimethoxyphenyl)biguanide]. When treated with two equivalents of acetic acid, this base is converted to its diacetate salt.

EXAMPLE 41

*1,1'-hexamethylenebis{5-[2,4-bis(methylmercapto)phenyl]biguanide}*

Following the same procedure as that described in part A of Example 1, but substituting an equimolar quantity of 2,4-bis(methylmercapto)aniline hydrochloride for the 4-methylmercaptoaniline hydrochloride, there is obtained as the reaction product the dihydrochloride of 1,1'-hexamethylenebis 5 - [2,4 - bis(methylmercapto)phenyl]biguanide (Formula I: $R^2=H$; R—X—=2-$CH_3$—S—;

$$Y=4-CH_3-S-$$

$Z=H$; $n=6$). By treating this salt with two equivalents of sodium hydroxide there is obtained the corresponding free base, 1,1'-hexamethylenebis{5-[2,4-bis-(methylmercapto)phenyl]biguanide}. When treated with two equivalents of acetic acid, this base is converted to its diacetate salt.

EXAMPLE 42

*1,1'-hexamethylenebis{5-[2-bromo-4,6-bis(methylsulfonyl)phenyl]biguanide}*

By interaction of 25 g. of 1,1'-hexamethylenebis(3-cyanoguanidine) with 72.8 g. of 2-bromo-4,6-bis(methylsulfonyl)aniline hydrochloride, there is obtained the dihydrochloride of 1,1'-hexamethylenebis{5-[2-bromo-4,6-bis(methylsulfonyl)phenyl]biguanide} (Formula I: $R^2=H$; R—X—=4-$CH_3$—$SO_2$—; Y=6-$CH_3$—$SO_2$—; Z=2-Br; $n=6$). This salt is converted to the free base, 1,1'-hexamethylenebis{5 - [2 - bromo - 4,6 - bis(methylsulfonyl)phenyl]biguanide}, by treatment with two molecular equivalents of sodium hydroxide.

When the 2-bromo-4,6-bis(methylsulfonyl)aniline hydrochloride in the foregoing example is replaced in one instance with an equimolar quantity of 2-benzylsulfonyl-4-ethylsulfonylaniline hydrochloride and in another instance with an equimolar quantity of 2-methylsulfonyl-4-ethylsulfonylaniline hydrochloride, there are obtained 1,1'-hexamethylenebis[5-(2 - benzylsulfonyl-4-ethylsulfonylphenyl)biguanide] dihydrochloride and 1,1'-hexamethylenebis[5-(2-methylsulfonyl - 4 - ethylsulfonylphenyl)biguanide] dihydrochloride, respectively. When treated with two equivalents of sodium hydroxide, these salts are converted to the corresponding free bases.

EXAMPLE 43

*1,1'-hexamethylenebis[5-(3-trifluoromethylmercaptophenyl)biguanide]*

By interaction of 25.0 g. of 1,1'-trimethylenebis(3-cyanoguanidine) with 45.8 g. of 3-(trifluoromethylmercapto)aniline hydrochloride, there is obtained the dihydrochloride of 1,1'-hexamethylenebis[5-(3-trifluoromethylmercaptophenyl)biguanide] (Formula I: $R^2=H$; R—X—=3-$F_3C$—S—; Y=H; Z=H; $n=6$). Treatment of this salt with two equivalents of sodium hydroxide yields the free base, 1,1'-hexamethylenebis[5-(3-trifluoromethylmercaptophenyl)biguanide].

When an equivalent quantity of 3-(trifluoromethylsulfonyl)aniline hydrochloride is substituted for the 3-(trifluoromethylmercapto)aniline hydrochloride in the foregoing example, the product obtained is the dihydrochloride of 1,1'-hexamethylenebis[5-(3-trifluoromethylsulfonylphenyl)biguanide] (Formula I: $R^2=H$;

$$R-X-=3-F_3C-SO_2-$$

Y=H; Z=H; $n=6$). Treatment of this salt with two equivalents of sodium hydroxide yields the free base, 1,1'-hexamethylenebis[5-(3 - trifluoromethylsulfonylphenyl)biguanide].

EXAMPLE 44

*1,1'-hexamethylenebis[5-(6-trifluoromethylsulfonyl-2,4-dinitrophenyl)biguanide]*

Following the same procedure as that described in part A of Example 6, but substituting an equimolar quantity of 6-trifluoromethylsulfonyl-2,4-dinitroaniline hydrochloride for the 4-methylsulfonylaniline hydrochloride, there is obtained for the 4-methylsulfonylaniline hydrochloride, there is obtained as the reaction product the dihydrochloride of 1,1'-hexamethylenebis[5-(6-trifluoromethylsulfonyl - 2,4 - dinitrophenyl)biguanide] (Formula I: $R^2=H$; R—X—=6-$F_3C$—$SO_2$—; Y=2-$NO_2$—;

$$Z=4-NO_2-$$

$n=6$). By treating this salt with the corresponding free base, 1,1'-hexamethylenebis[5-(6-trifluoromethylsulfonyl-2,4-dinitrophenyl)biguanide]. When treated with two equivalents of acetic acid, this base is converted to its diacetate salt.

EXAMPLE 45

*1,1'-octamethylenebis[5-(2-allylmercaptophenyl)biguanide]*

Interaction of 27.8 g. of 1,1'-octamethylenebis(3-cyanoguanidine) with 40.3 g. of 2-allylmercaptoaniline hydrochloride yields the dihydrochloride of 1,1'-octamethylenebis[5 - (2 - allylmercaptophenyl)biguanide] (Formula I: $R^2=H$; R—X—=2-($CH_2$=CH—$CH_2$—S—); Y=H; Z=H; $n=8$). Treatment of this salt with two equivalents of sodium hydroxide yields the free base 1,1'-octamethylenebis[5-(2-allylmercaptophenyl)biguanide].

By substituting an equivalent amount of 4-methallylmercaptoaniline hydrochloride for the 2-allylmercaptoaniline hydrochloride in the foregoing example there is obtained the dihydrochloride of 1,1'-octamethylenebis-[5-(4-methallylmecraptophenyl)biguanide] (Formula I: $R^2=H$; R—X—=4-[$CH_2$=C($CH_3$)—$CH_2$—S]—;

$$Y=H$$

Z=H; $n=8$). Treatment of this salt with two equivalents of sodium hydroxide yields the free base, 1,1'-octamethylenebis[5-(4-methallylmercaptophenyl)biguanide].

EXAMPLE 46

Following the procedure of part A of Example 13, but substituting 43 g. of 3-benzylmercaptoaniline hydrochloride for the 4-ethylmercaptoaniline hydrochloride, there is obtained the dihydrochloride of 1,1'-hexamethylenebis[5-(3-benzylmercaptophenyl)biguanide] (Formula I: $R^2=H$; R—X—=3-$C_6H_5CH_2$—S—; Y=H; Z=H; $n=6$). This salt is converted to the free base, 1,1'-hexamethylenebis[5 - (3 - benzylmercaptophenyl)biguanide], by treatment with two equivalents of sodium hydroxide.

Similarly, following the procedure of part A of Example 13, but substituting for the 4-ethylmercaptoaniline hydrochloride in separate instances an equivalent amount each of:

4-(benzylsulfinyl)aniline hydrochloride;
2-(3,4-dichlorobenzylsulfonyl)aniline hydrochloride;
4-(4-methoxybenzylsulfonyl)aniline hydrochloride;
2-(4-methylbenzylsulfonyl)-5-chloroaniline hydrochloride; and
4-(4-nitrobenzylmercapto)aniline hydrochloride,
the respective reaction products obtained are:
1,1'hexamethylenebis{5-[4-(benzylsulfinyl)phenyl]biguanide} dihydrochloride;
1,1'-hexamethylenebis{5-[2-(3,4-dichlorobenzyl)sulfonylphenyl]biguanide} dihydrochloride;
1,1'-hexamethylenebis{5-[2-(4-methylbenezylsulfonyl)-5-chlorophenyl]biguanide} dihydrochloride;
1,1'-hexamethylenebis{5-[4-(4-methoxybenzyl)sulfonylphenyl]biguanide}dihydrochloride; and
1,1'-hexamethylenebis{5-[4-(4-nitrobenzylmercapto)-phenyl]biguanide} dihydrochloride.

By treatment with two equivalents of sodium hydroxide, each of these dihydrochlorides is converted to the corresponding free base.

EXAMPLE 47

*1,1'-hexamethylenebis[5-(4-cyclohexylmercapto-phenyl)biguanide]*

Following the procedure of part A of Example 1, but substituting 45.5 g. of 4-cyclohexylmercaptoaniline hydrochloride for the 4-methylmercaptoaniline hydrochloride, there is obtained the dihydrochloride of 1,1'-hexamethylenebis[5-(4-cyclohexylmercaptophenyl)biguanide] (Formula I: $R^2$=H; R—X—=4-$C_6H_{11}$—S—; Y=H; Z=H; $n$=6). This salt is converted to the free base, 1,1'-hexamethylenebis[5 - (4 - cyclohexylmercaptophenyl)biguanide], by treatment with two equivalents of sodium hydroxide.

EXAMPLE 48

*1,1'-decamethylenebis[5-(4-phenylmercaptophenyl)biguanide]*

Following the procedure of part A of Example 13, but substituting 24.5 g. of 1,1'-decamethylenebis(3-cyanoguanidine) for the 1,1' - hexamethylenebis(3 - cyanoguanidine) and 40.5 g. of 4-phenylmercaptoaniline hydrochloride for the 4-ethylmercaptoaniline hydrochloride, there is obtained the dihydrochloride of 1,1'-decamethylenebis[5-(4-phenylmercaptophenyl)biguanide] (Formula I: $R^2$=H; R—X—=4-$C_6H_5$—S—; Y=H; Z=H; $n$=10). This salt is converted to the free base, 1,1'-decamethylenebis[5-(4-phenylmercaptophenyl)biguanide], by treatment with two equivalents of sodium hydroxide.

EXAMPLE 49

*1,1'-decamethylenebis[5-(4-phenylsulfinylphenyl)biguanide]*

By oxidation of 1,1'-decamethylenebis[5-(4-phenylmercaptophenyl)biguanide] dihydrochloride with one equivalent of hydrogen peroxide (30 percent solution), there is obtained the dihydrochloride of 1,1'-decamethylenebis[5-(4-phenylsulfinylphenyl)biguanide] (Formula I: $R^2$=H; R—X—=4-$C_6H_5$—SO—; Y=H; Z=H; $n$=10). This salt is converted to the free base, 1,1'-decamethylenebis[5-(4-phenylsulfinylphenyl)biguanide], by treatment with two equivalents of sodium hydroxide.

1,1'-decamethylenebis[5 - (4 - phenylsulfinylphenyl)biguanide] dihydrochloride is also obtained when 30.6 g. of 1,1'-decamethylenebis(3-cyanoguanidine) is reacted with 57 g. of 4-(phenylsulfinyl)aniline hydrochloride.

EXAMPLE 50

*1,1'-hexamethylenebis{5-[4-(4-nitrophenylmercapto)phenyl]biguadine}*

A. A mixture of 50.5 g. of 1,1'-hexamethylenebis(3-cyanoguanidine), 115.0 g. of 4-amino-4'-nitrodiphenyl sulfide hydrochloride, and 500 ml. of 2-ethoxyethanol was refluxed for five hours. During this heating period, all of the solid dissolved and then a precipitate separated from the solution. After completion of the reflux period, the reaction mixture was filtered while hot, and the solid thus collected on the filter was washed with hot 2-ethoxyethanol and then sucked dry on the filter. The solid, which weighed 51 g., was dissolved in hot 50 percent aqueous acetic acid solution, and after addition of decolorizing charcoal the resulting solution was filtered. The filtrate was chilled, with occasional stirring, and the solid which separated from solution was collected on a filter, washed with cold 50 percent aqueous acetic acid solution and with cold water, and sucked dry on the filter. There was thus obtained 29.1 g. of yellowish-tan powder which melted at 257–260° C. This product was the dihydrochloride of 1,1'-hexamethylenebis{5-[4-(4-nitrophenylmercapto)phenyl]biguanide} (Formula I: $R^2$=H; R—X—=4-(4-$O_2N$—$C_6H_4$)—S—; Y=H; Z=H; $n$=6), having the molecular formula $$C_{34}H_{38}N_{12}O_4S_2 \cdot 2HCl.$$

The solubility of this compound at 25° C. was less than 0.25 percent, and its solubility in ethylalcohol at 25° C. was less than 1 percent (weight/volume).

When this compound was tested for in vitro antibacterial and antifungal activity, the respective maximum effective aqueous dilutions showing bacteriostatic (Bs), bactericidal (Bc), fungistatic (Fs) or fungicidal (Fc) activity against the indicated test organisms were as follows:

*Staphylococcus aureus* 209: Bs=1–130,000; Bc=1–40,000;
*Eberthella typhi*, Hopkins: Bs=1–40,000; Bc=1–10,000;
*Pseudomonas aeruginosa*: Bs=1–10,000; Bc=1–3,000;
*Clostridium welchii*, M: Bs=1–130,000; Bc=1–130,000;
*Mycobacterium tuberculosis*, H37Rv: Bs=1–4,000; Bc=1–4,000;
*Trichophyton mentagrophytes*: Fs=1–10,000; Fc=1–10,000;
*Monilia albicans*: Fs=1–10,000; Fc=1–1,000.

EXAMPLE 51

*1,1'-hexamethylenebis{5-[4-(4-nitrophenylsulfinyl)phenyl]biguanide}*

Oxidation of 1,1'-hexamethylenebis 5 - [4 - (4 - nitrophenylmercapto)phenyl]biguanide dihydrochloride with one molecular equivalent of hydrogen peroxide (30 percent solution) at room temperature yields the dihydrochloride of 1,1'-hexamethylenebis{5-[4-(4-nitrophenylsulfinyl)phenyl]biguanide} (Formula I: $R^2$=H;

R—X—=4-(4-$O_2N$—$C_6H_4$)—SO—

Y=H; Z=H; $n$=6). Treatment of this salt with two equivalents of sodium hydroxide yields the free base, 1,1' - hexamethylenebis{5 - [4 - (4 - nitrophenylsulfinyl)-phenyl]biguanide}.

EXAMPLE 52

*1,1'-hexamethylenebis{5-[4-(4-nitrophenylsulfonyl)-phenyl]biguanide}*

To a slurry of 18.0 g. of 1,1'-hexamethylenebis{5-[4-(4-nitrophenylmercapto)phenyl]biguanide} dihydrochloride in 75 ml. of water at 20° C. there was added dropwise 16.7 ml. (6.69 g.) of aqueous peracetic acid solution. The reaction mixture was stirred for two hours at room temperature (about 25° C.) and for two and one-half hours at 40° C. The reaction mixture was then chilled and filtered to collect the solid which had precipitated. The collected solid was washed with cold water and dried. The dry solid was ground in a mortar, washed again with cold water, re-collected, and dried. A 10 g. portion of this solid was recrystallized from 50 ml. of 50 percent aqueous acetic acid solution, using decolorizing charcoal. There was thus obtained 5 g. of white solid which melted at 220–230° C. with decomposition. This product was the dihydrochloride of 1,1'-hexamethylenebis{5-[4-(4-nitrophenylsulfonyl)phenyl]biguanide} (Formula I: $R^2$=H;

R—X—=4-(4-$O_2N$—$C_6H_4$)—$SO_2$—

Y=H; Z=H; $n$=6), having the molecular formula $C_{34}H_{38}N_{12}O_8S_2 \cdot 2HCl$. This salt was soluble in hot N,N-dimethylformamide and in hot dimethyl sulfoxide. By treatment with two equivalents of sodium hydroxide, this salt is converted to the corresponding free base, 1,1'-hexamethylenebis{5 - [4 - (4 - nitrophenylsulfonyl)phenyl]biguanide}.

The above dihydrochloride is also obtained when 1,1'-hexamethylenebis{5-[5-(4 - nitrophenylsulfinyl)phenyl]-biguanide} dihydrochloride is oxidized with one equivalent of peracetic acid.

EXAMPLE 53

Following the manipulative procedure of part A of Example 50, and interacting 1,1'-heptamethylenebis(3-cyanoguanidine), and 4-(4-methylphenylmercapto)aniline hydrochloride, there is obtained 1,1'-heptamethylenebis{5-[4-(4-methylphenyl)mercaptophenyl]biguanide} dihydrochloride; and interacting 1,1'-pentamethylenebis(3-cyanoguanidine) and 4-(4-methoxyphenylmercapto)aniline hydrochloride, there is obtained 1,1'-pentamethylenebis{5-[4-(4 - methoxyphenyl)mercaptophenyl]biguanide} dihydrochloride. When these two dihydrochlorides are each treated with two equivalents of sodium hydroxide, they are converted to the corresponding free bases. By oxidation of each of the dihydrochlorides with one molecular equivalent of hydrogen peroxide (30 percent solution) at room temperature, there are obtained 1,1'-heptamethylenebis{5 - [(4-methylphenyl)sulfinylphenyl]biguanide} dihydrochloride and 1,1' - pentamethylenebis 5 - [4 - (4-methoxyphenyl)sulfinylphenyl]biguanide dihydrochloride, respectively; and treatment of each of these two dihydrochloride products with two equivalents of sodium hydroxide yields the corresponding free bases. Oxidation of each of the mercapto dihydrochlorides with two equivalents of peracetic acid yields, 1,1'-heptamethylenebis{5-[(4-methylphenyl)sulfonylphenyl]biguanide} dihydrochloride and 1,1' - pentamethylenebis{5 - [4 - (4-methoxyphenyl)sulfonylphenyl]biguanide} dihydrochloride, respectively. These same sulfonyl dihydrochlorides are obtained by oxidation of each of the corresponding sulfinyl dihydrochlorides with one equivalent of peracetic acid. The sulfonyl dihydrochlorides are converted to the corresponding free bases by treating each with two equivalents of sodium hydroxide.

EXAMPLE 54

*1,1'-hexamethylenebis{5-[4-(4-aminophenylmercapto)-phenyl]biguanide}*

To a mixture of 20 g. of the dihydrochloride of 1,1'-hexamethylenebis{5-[4-(4 - nitrophenylmercapto)phenyl]-biguanide}, 120 ml. of 95 percent ethyl alcohol, 40 ml. of water, and 1 mol of acetic acid, there was added in small portions with stirring, 25 g. of iron powder (reduced with hydrogen). The reaction mixture was refluxed for six hours and was then filtered, using a steam heated filter. The filtrate was chilled for two days, and the pink solid which separated from solution was collected on a filter, washed with 75 percent aqueous ethyl alcohol solution, and dried. This solid weighed 4 g.; a 2 g. portion of it was recrystallized from 6 ml. of 50 percent aqueous acetic acid solution, using decolorizing charcoal, to yield a white solid which melted at 244–247° C. with decomposition, shrinkage beginning at 160° C. This product was the dihydrochloride of 1,1'-hexamethylenebis{5-[4-(4-aminophenylmercapto)phenyl]biguanide} (Formula I: $R^2=H$; R—X—=4-(4-$H_2$N—$C_6H_4$)—S—; Y=H; Z=H; n=6), having the molecular formula $C_{34}H_{40}N_{12}O_2S_2 \cdot 2HCl$. This salt was insoluble in anhydrous ethyl alcohol and in ethyl acetate, even when these were heated. It was soluble in hot water, hot methyl alcohol, and hot 50 percent aqueous acetic acid solution. By treatment with two equivalents of sodium hydroxide, the dihydrochloride is converted to the free base, 1,1'-hexamethylenebis{5-[4-(4-aminophenylmercapto)phenyl]biguanide}.

EXAMPLE 55

*1,1'-(1,5-hexylene)bis[5-(4-methylmercaptophenyl)biguanide]*

Following the procedure of part A of Example 1, but using 22 g. of 1,1'-(1,5-hexylene)bis(3-cyanoguanidine) (obtained by interaction of 1,5-hexanediamine dihydrochloride with two molecular proportions of sodium dicyanamide in boiling butanol) in place of the 1,1'-hexymethylenebis(3-cyanoguanidine), there is obtained the dihydrochloride of 1,1'-(1,5-hexylene)bis[5-(4-methylmercaptophenyl)biguanide] (Formula I: $R^2=H$; R—X—=4-$CH_3$—S—; Y=H; Z=H; n=6). By treatment with two equivalents of sodium hydroxide, this dihydrochloride is converted to the corresponding free base, 1,1'-(1,5-hexylene)bis[5-(4-methylmercaptophenyl)biguanide].

Similarly, the corresponding 1,4-pentylene-bridged compound, 1,1'-(1,4-pentylene)bis[5-(4-methylmercaptophenyl)biguanide]dihydrochloride, is obtained by employing 22 g. of 1,1'-(1,4-pentylene)bis(3-cyanoguanidine) (obtained by interaction of 1,4-pentanediamine dihydrochloride with two molecular proportions of sodium dicyanamide in boiling butanol) in place of the 1,1'-hexamethylenebis(3-cyanoguanidine) in part A of Example 1.

EXAMPLE 56

*1-1'-hexamethylenebis{5-[4-(4-iodophenylmercapto)phenyl]biguanide}*

Following the procedure of part A of Example 1, but substituting 68 g. of 4-(4-iodophenylmercapto)aniline hydrochloride for the 4-methylmercaptoaniline hydrochloride, there is obtained the dihydrochloride of 1,1'-hexamethylenebis{5 - [4-(4-iodophenylmercapto)phenyl]biguanide} (Formula I: $R^2=H$;

$$R-X-=4-(4-I-C_6H_4)-S-$$

Y=H; Z=H; n=6). This salt is converted to the free base, 1,1'-hexamethylenebis{5-[4-(4-iodophenylmercapto)phenyl]biguanide}, by treatment with two equivalents of sodium hydroxide.

EXAMPLE 57

Following the same procedure as that described in part A of Example 1, but employing a mixture of 16.5 g. of 4-methylmercaptoaniline hydrochloride and 17.8 g. of 4-ethylmercaptoaniline hydrochloride instead of the 4-methylmercaptoaniline hydrochloride alone, there is produced a mixture of the dihydrochlorides of the symmetrical compounds 1,1'-hexamethylenebis[5-(4-methylmercaptophenyl)biguanide] and 1,1'-hexamethylenebis[5-(4-ethylmercaptophenyl)biguanide] and the unsymmetrical compound 1 - (4 - methylmercaptophenylbiguanido)6-(4-ethylmercaptophenylbiguanido)hexane. It is not necessary to separate this mixture into its several constituents, although this can be done, if desired, by conventional crystallization procedures, since the mixture is directly useful as an antibacterial, antifungal, and antiviral agent. By treating the mixture of dihydrochlorides with sodium hydroxide, there is obtained a mixture of the corresponding free organic bases, which interacts with acids to form a mixture of the respective acid-addition salts of the bases.

EXAMPLE 58

*1,1'-octamethylenebis[5-(4-methylmercaptophenyl)biguanide]*

Following the manipulative procedure of part A of Example 1, 17.5 g. of 1,1'-octamethylenebis(3-cyanoguanidine) was interacted with 21.5 g. of 4-methylmercaptoaniline hydrochloride in 145 ml. of 2-ethoxyethanol to produce the dihydrochloride of 1,1'-octamethylenebis [5-(4-methylmercaptophenyl)biguanide] (Formula I: $R^2=H$; R—X—=4-$CH_3$—S—; Y=H; Z=H; n=8).

EXAMPLE 59

*1,1'-decamethylenebis[5-(4-methylmercaptophenyl)biguanide]*

Following the manipulative procedure of part A of Example 1 and interacting 26.3 g. of 4-methylmercaptoaniline hydrochloride and 23.6 g. of 1,1'-decamethylenebis(3-cyanoguanidine) in 185 ml. of 2-ethoxyethanol, there was obtained the dihydrochloride of 1,1'-decamethylenebis[5 - (4 - methylmercaptophenyl)biguanide]

(Formula I: R²=H; R—X—=4-CH₃—S—; Y=H; Z=H; n=10), having the molecular formula $$C_{28}H_{44}N_{10}S_2 \cdot 2HCl$$

as an off-white solid which melted at 202–204° C. This salt is converted to the free base, 1,1'-decamethylenebis[5-(4-methylmercaptophenyl)biguanide], by treatment with two equivalents of sodium hydroxide.

EXAMPLE 60

*1,1'-hexamethylenebis{5-[4-(4-aminobenzylmercapto)phenyl]biguanide}*

Following the reduction procedure of Example 54, but substituting an equivalent quantity of 1,1'-hexamethylenebis{5-[4-(4-nitrobenzylmercapto)phenyl]biguanide} dihydrochloride for the 1,1'-hexamethylenebis{5-[4-(4-nitrophenylmercapto)phenyl]biguanide} dihydrochloride, there is obtained the dihydrochloride of 1,1'-hexamethylenebis{5-[4-(4-aminobenzylmercapto)phenyl]biguanide} (Formula I: R²=H;

R—X—=4-(4-H₂N—C₆H₄—CH₂—S—)

Y=H; Z=H; n=6). This salt is converted to the free base, 1,1'-hexamethylenebis{5-[4-(4-aminobenzylmercapto)phenyl]biguanide}, by treatment with two molecular equivalents of sodium hydroxide.

EXAMPLE 61

*1,1'-hexamethylenebis[5-ethyl-5-(4-ethylmercaptophenyl)biguanide]*

By refluxing a mixture of 29.4 g. of N - ethyl - 4-ethylmercaptoaniline hydrochloride, 15.3 g. of 1,1'-hexamethylenebis(3 - cyanoguanidine), and 550 ml. of water, there was obtained 8.6 g. of the dihydrochloride of 1,1'-hexamethylenebis[5 - ethyl - 5 - (4 - ethylmercaptophenyl)biguanide] (Formula I: R²=C₂H₅; R—X—= 4-C₂H₅—S—; Y=H; Z=H; n=6), having the molecular formula C₃₀H₄₈N₁₀S₂·2HCl, as a white solid which melted at 194–196° C. This salt is converted to the free base, 1,1' - hexamethylenebis[5 - ethyl - 5 - (4 - ethylmercaptophenyl)biguanide], by treatment with two equivalents of sodium hydroxide.

EXAMPLE 62

*1,1'-trimethylenebis[5-(4-n-butylmercaptophenyl)biguanide]*

By interacting 46 g. of 4 - methylmercaptoaniline hydrochloride and 23 g. of 1,1' - trimethylenebis(3 - cyanoguanidine) in 320 ml. of 2 - ethoxyethanol, there was obtained 7.6 g. of the dihydrochloride of 1,1' - trimethylenebis[5 - (4 - n - butylmercaptophenyl)biguanide] (Formula I: R²=H; R—X—=4 - CH₃CH₂CH₂CH₂—S—; Y=H; Z=H; n=3), having the molecular formula $$C_{27}H_{42}N_{10}S_2 \cdot 2HCl$$

as a rose-colored solid which melted at 114–115° C. This salt is converted to the free base, 1,1' - trimethylenebis[5 - (4 - n - butylmercaptophenyl)biguanide], by treatment with two equivalents of sodium hydroxide.

EXAMPLE 63

*1,1'-hexamethylenebis[5-(4-n-amylsulfonylphenyl)biguanide]*

By treatment of a slurry of 82 g. of 1,1' - hexamethylenebis[5 - (4 - ethylmercaptophenyl)biguanide] dihydrochloride in 700 ml. of water at room temperature with 76 ml. of 40 percent peracetic acid, there was obtained the dihydrochloride of 1,1' - hexamethylenebis[5 - (4 - n - amylsulfonylphenyl)biguanide] (Formula I: R²=H;

R—X—=4-CH₃CH₂CH₂CH₂CH₂—SO₂—

Y=H; Z=H; n=6), which was treated with two molecular equivalents of sodium hydroxide to yield 32.5 g. of the free base, 1,1' - hexamethylenebis[5 - (4 - n - amylsulfonylphenyl)biguanide], having the molecular formula C₃₂H₅₂N₁₀O₄S₂, as a peach-colored solid which melted at 176–177° C.

EXAMPLE 64

*1,1'-pentamethylenebis[5-methyl-5-(4-methylsulfonyl-3-chlorophenyl)biguanide]*

By refluxing a mixture of N - methyl - 4 - methylsulfonyl - 3 - chloroaniline hydrochloride, 1,1' - pentamethylenebis(3 - cyanoguanidine), and water, there is obtained the dihydrochloride of 1,1'-pentamethylenebis[5-methyl-5 - (4 - methylsulfonyl - 3 - chlorophenyl)biguanide] (Formula I: R²=CH₃; R—X—=4-CH₃—SO₂; Y=3—Cl, Z=H; n=5). This salt is converted to the free base, 1,1'-pentamethylenebis[5 - methyl - 5 - (4 - methylsulfonyl-3 - chlorophenyl)biguanide], by treatment with two equivalents of sodium hydroxide.

EXAMPLE 65

*1,1'-hexamethylenebis[5-(4-n-hexylsulfonylphenyl)biguanide]*

By treatment of a slurry of 108.8 g. of 1,1' - hexamethylenebis[5 - (4 - n - hexylmercaptophenyl)biguanide] dihydrochloride in 510 ml. of water with 124 ml. of 40 percent peracetic acid (with occasional use of an ice-bath to keep the temperature of the reaction mixture below 35° C.), there was obtained the dihydrochloride of 1,1'-hexamethylenebis[5 - (4 - n - hexylsulfonylphenyl)biguanide] (Formula I: R²=H;

R—X—=4-CH₃CH₂CH₂CH₂CH₂CH₂—SO₂—

Y=H; Z=H; n=6), which was treated with two molecular equivalents of sodium hydroxide to yield 34.1 g. of the free base, 1,1' - hexamethylenebis[5 - (4 - n - hexylsulfonylphenyl)biguanide], having the molecular formula C₃₄H₅₆N₁₀S₂O₄, as a peach-colored solid which melted at 162–166° C.

We claim:

1. A compound of the group consisting of: 1,1'-(alkylenebis(5-arylbiguanides) having the formula

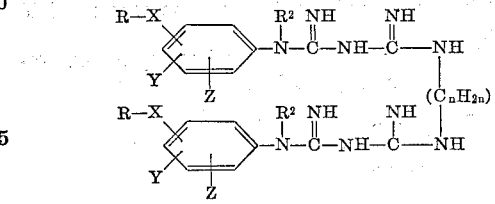

wherein: $C_nH_{2n}$ represents a bivalent alkylene bridge in which the free valence bonds are on two different carbon atoms and $n$ is an integer from 2 to 12 inclusive; R² is a member of the group consisting of hydrogen and alkyl containing 1–4 carbon atoms; Y is a member of the group consisting of hydrogen, halogen, trifluoromethyl, nitro, lower alkyl —O—, lower alkyl —S—, lower alkyl —SO—, and lower alkyl —SO₂—; Z is a member of the group consisting of hydrogen, halogen, nitro, lower alkyl, and lower alkyl —O—; R is a member of the group consisting of alkyl containing 1–18 carbon atoms, halo-lower alkyl, lower alkenyl, benzyl, ar-halobenzyl, ar-nitrobenzyl, ar-lower alkylbenzyl, ar-lower alkoxybenzyl, cyclohexyl, phenyl, lower alkylphenyl, nitrophenyl, lower alkoxyphenyl, halophenyl, and, when neither of Y and Z is nitro, the further members ar-aminobenzyl and aminophenyl; and X is a member of the group consisting of —S—, —SO—, and —SO₂—; and acid-addition salts thereof.

2. 1,1' - polymethylenebis[5 - (alkylmercaptophenyl)biguanide] having the formula

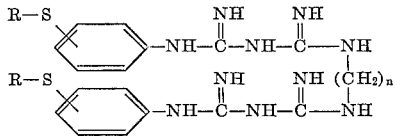

wherein R is alkyl containing 1–18 carbon atoms and *n* is an integer from 2 to 12 inclusive.

3. 1,1' - hexamethylenebis[5 - (alkylmercaptophenyl)-biguanide] having the formula

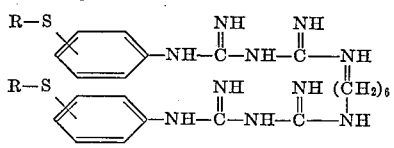

wherein R is alkyl containing 1–18 carbon atoms.

4. 1,1-hexamethylenebis[5 - (alkylsulfinylphenyl) - biguanide] having the formula

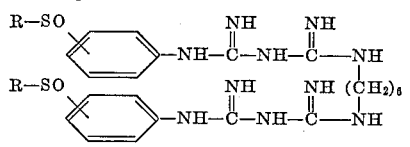

wherein R is alkyl containing 1–18 carbon atoms.

5. 1,1'-hexamethylenebis[5 - (alkylsulfonylphenyl) - biguanide] having the formula

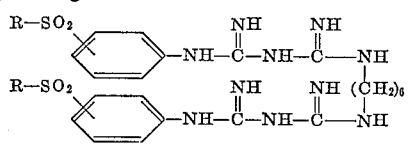

wherein R is alkyl containing 1–18 carbon atoms.

6. 1,1'-hexamethylenebis[5-(alkylmercapto - halophenyl)-biguanide] having the formula

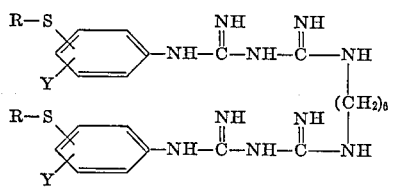

wherein R is alkyl containing 1–18 carbon atoms and Y is halogen.

7. 1,1' - hexamethylenebis[5 - (alkylmercapto - chlorophenyl)biguanide] having the formula

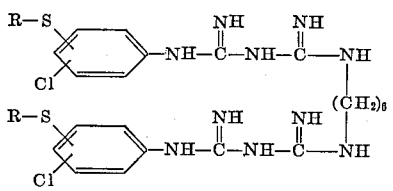

wherein R is alkyl containing 1–18 carbon atoms.

8. 1,1'-hexamethylenebis[5 - ($R^2$) - 5 - (alkylmercaptophenyl)biguanide] having the formula

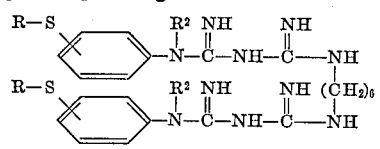

wherein R is alkyl containing 1–18 carbon atoms and $R^2$ is alkyl containing 1–4 carbon atoms.

9. 1,1'-hexamethylenebis[5 - (4 - lower alkylmercaptophenyl)biguanide] having the formula

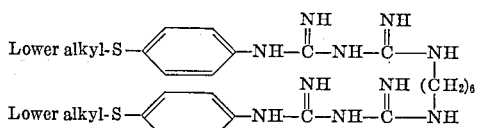

10. 1,1'-hexamethylenebis[5-(4 - lower alkylmercapto-3-halophenyl)biguanide] having the formula

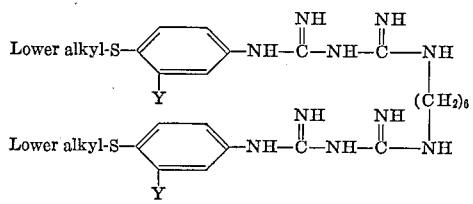

where Y is halogen.

11. 1,1'-hexamethylenebis[5 - (4 - lower alkylsulfonylphenyl)biguanide] having the formula

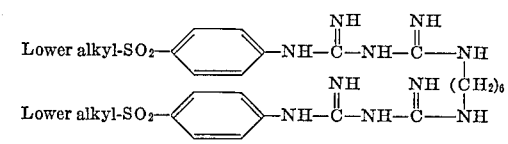

12. 1,1'-hexamethylenebis[5-(4 - methylmercaptophenyl)biguanide].
13. 1,1'-hexamethylenebis[5 - (4 - ethylmercaptophenyl)biguanide].
14. 1,1'-hexamethylenebis[5-(4-n butylmercaptophenyl)biguanide].
15. 1,1' - hexamethylenebis[5 - (4 - n - amylmercaptophenyl)biguanide].
16. 1,1'-hexamethylenebis[5 - (4 - methylmercapto - 3-chlorophenyl)biguanide].
17. 1,1'-hexamethylenebis[5-(4-ethylmercapto - 3 - chlorophenyl)biguanide].
18. 1,1'-hexamethylenebis[5-(4-n - propylmercapto - 3-chlorophenyl]biguanide].

References Cited by the Examiner

UNITED STATES PATENTS

| | | | |
|---|---|---|---|
| 2,684,924 | 7/1954 | Rose et al. | 260—565 X |
| 2,690,455 | 9/1954 | Kaiser et al. | 260—565 |
| 2,836,539 | 5/1958 | Cutler. | |
| 2,990,425 | 6/1961 | Senior | 260—565 X |

FOREIGN PATENTS 599,714   3/1948   Great Britain.

OTHER REFERENCES

Conant et al., "The Chemistry of Organic Compounds," 4th ed., page 335 (1952).

CHARLES B. PARKER, *Primary Examiner.*

JOSEPH P. BRUST, *Examiner.*

F. D. HIGEL, *Assistant Examiner.*